United States Patent [19]

Moriarty et al.

[11] Patent Number: 5,779,244
[45] Date of Patent: Jul. 14, 1998

[54] SEAL APPARATUS

[76] Inventors: Maurice J. Moriarty, 70 Clark Rd., Rye, N.H. 03870; Joseph E. Whitesell, 9 E. Calavar, Moon Valley, Ariz. 85022

[21] Appl. No.: 475,490

[22] Filed: Jun. 7, 1995

Related U.S. Application Data

[60] Division of Ser. No. 111,371, Aug. 23, 1993, Pat. No. 5,618,048, which is a continuation-in-part of Ser. No. 774,054, Oct. 8, 1991, abandoned, which is a continuation-in-part of Ser. No. 538,886, Jun. 18, 1990, abandoned, which is a continuation-in-part of Ser. No. 267,542, Nov. 4, 1988, abandoned, which is a continuation-in-part of Ser. No. 172,657, Mar. 24, 1988, abandoned.

[51] Int. Cl.$^6$ .................................................. F16J 15/56
[52] U.S. Cl. ........................................... 277/311; 277/630
[58] Field of Search ............................ 277/33, 44, 45, 277/46, 142, 1, 192, 193, 194, 195, 198, 199, 216, 223; 123/188.6

[56] References Cited

U.S. PATENT DOCUMENTS

| | | | |
|---|---|---|---|
| 724,698 | 4/1903 | Harder et al. | 277/35 |
| 754,065 | 3/1904 | Hodge | 277/44 |
| 754,139 | 3/1904 | Hodge | 277/44 |
| 980,594 | 1/1911 | Bulock | 277/44 |
| 1,025,792 | 5/1912 | Doolan | 277/46 |
| 1,089,789 | 3/1914 | Ramberg | 277/142 |
| 3,082,011 | 3/1963 | Kroekel | 277/142 |
| 3,162,185 | 12/1964 | Knoblock | 123/186.6 |
| 3,498,621 | 3/1970 | Wilson | 277/33 |
| 4,706,967 | 11/1987 | Ochsner | 277/33 |
| 4,773,363 | 9/1988 | Stritzke | 277/33 |
| 5,460,139 | 10/1995 | Marlin et al. | 123/186.6 |

Primary Examiner—William A. Cuchlinski, Jr.
Assistant Examiner—John L. Beres
Attorney, Agent, or Firm—Parsons & Goltry; Robert A. Parsons; Michael W. Goltry

[57] ABSTRACT

A seal assembly includes first and second annular members which reside in axial juxtaposition to be carried by one of a pair of coaxially movable components for sealingly engaging the other of the pair of components. The assembly may be carried in an annular groove formed in one of the components. Further provided is a generally cup shaped carrier for holding the assembly in a counterbore coaxially formed in the outer one of the components. One of the annular members may include a recess for receiving the other member. Each of the members is severed by an end gap which lie along divergent axes.

6 Claims, 16 Drawing Sheets

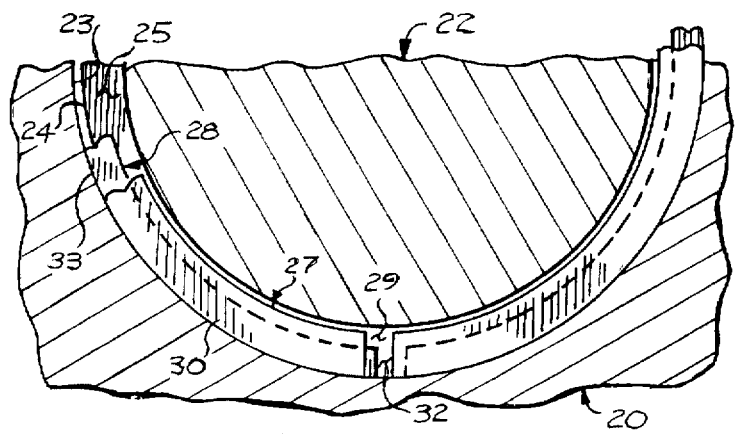
FIG. 1 [PRIOR ART]
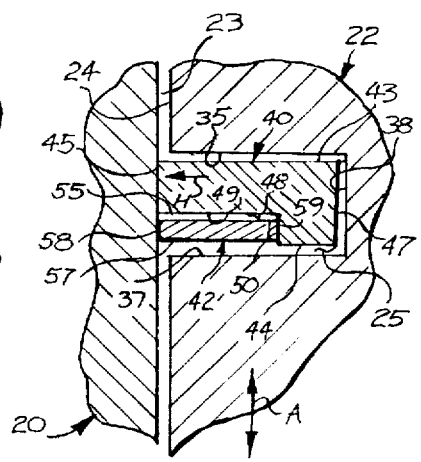
FIG. 3
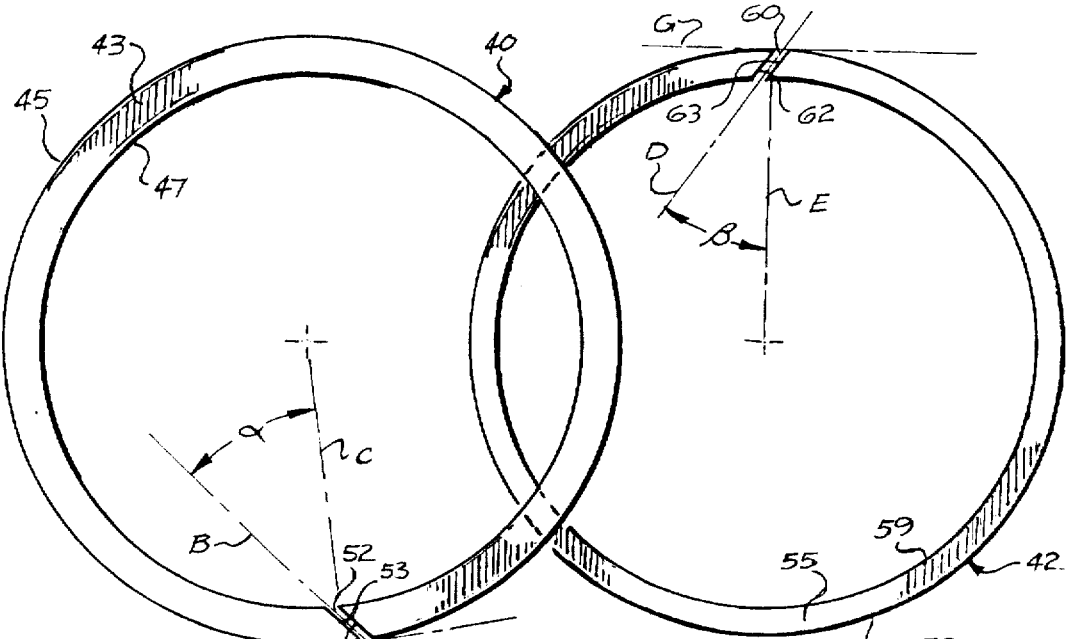
FIG. 2
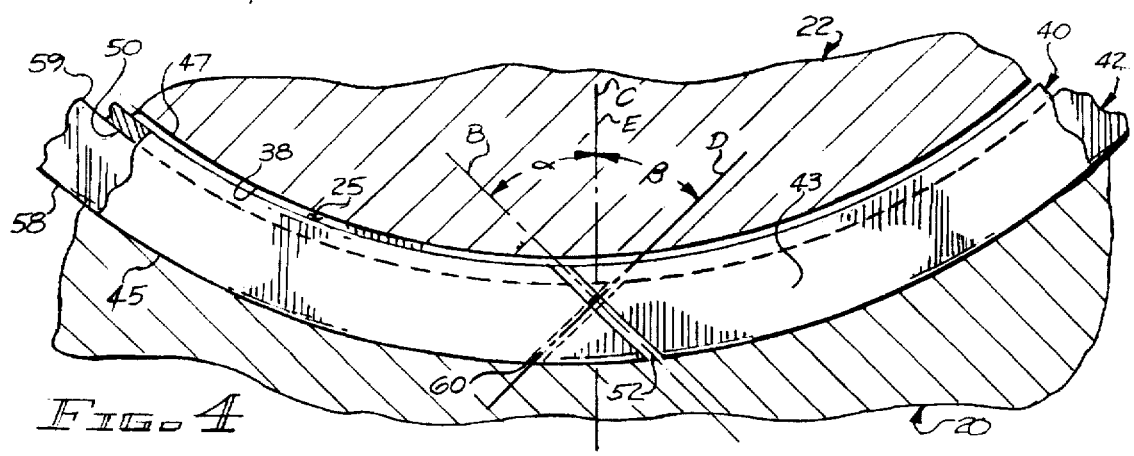
FIG. 4

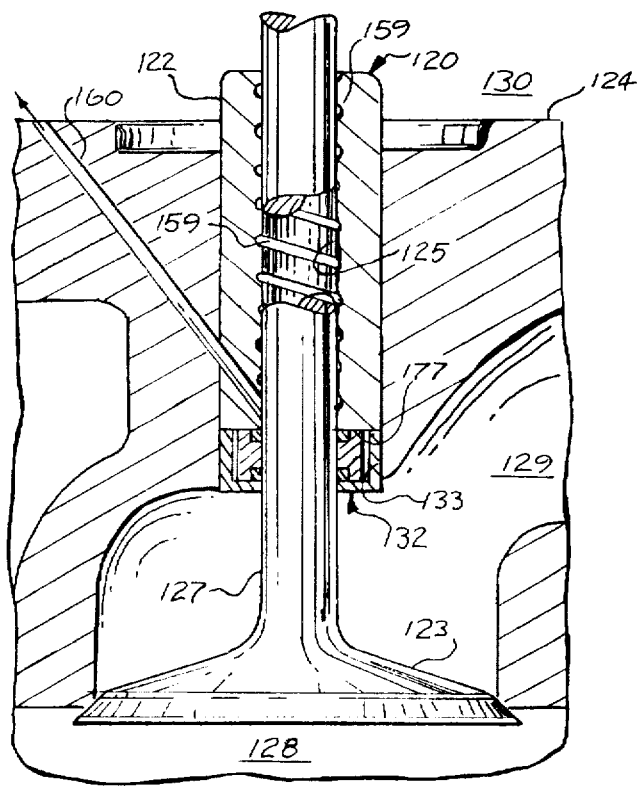
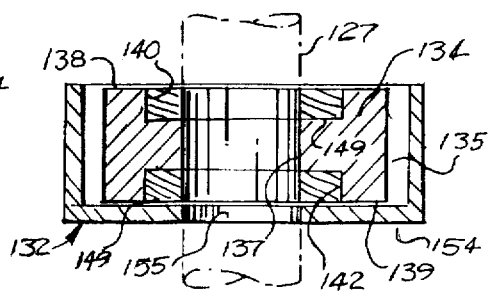
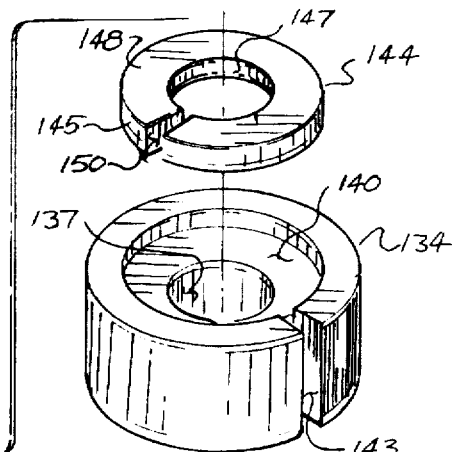
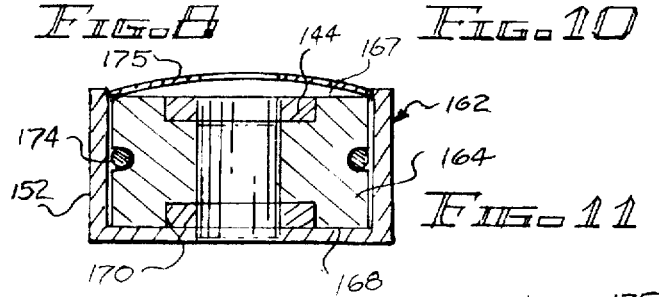
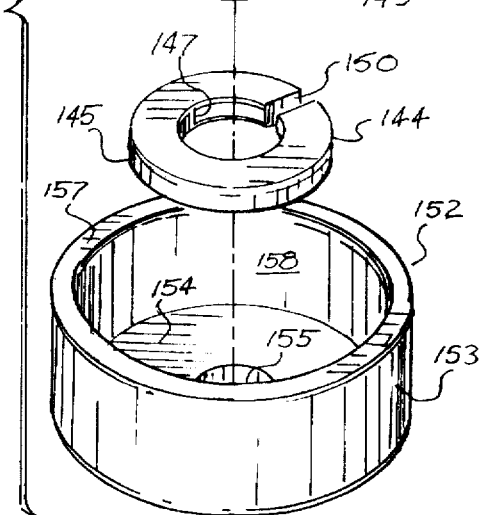
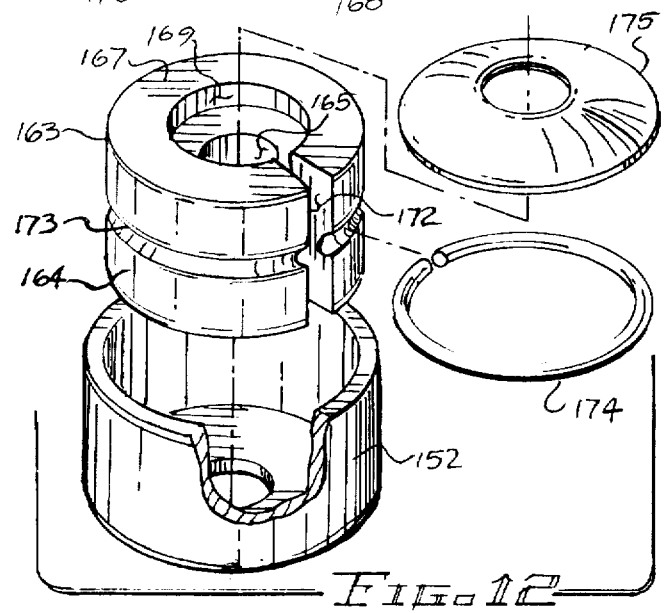
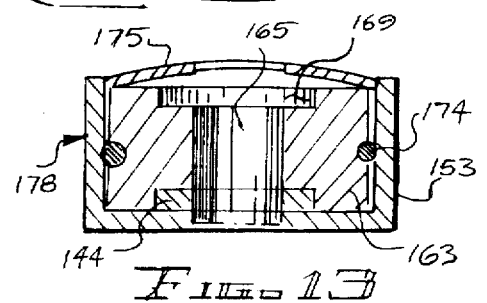

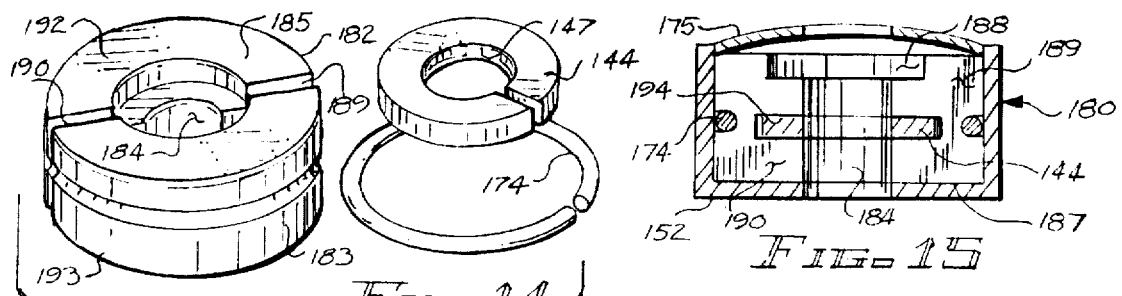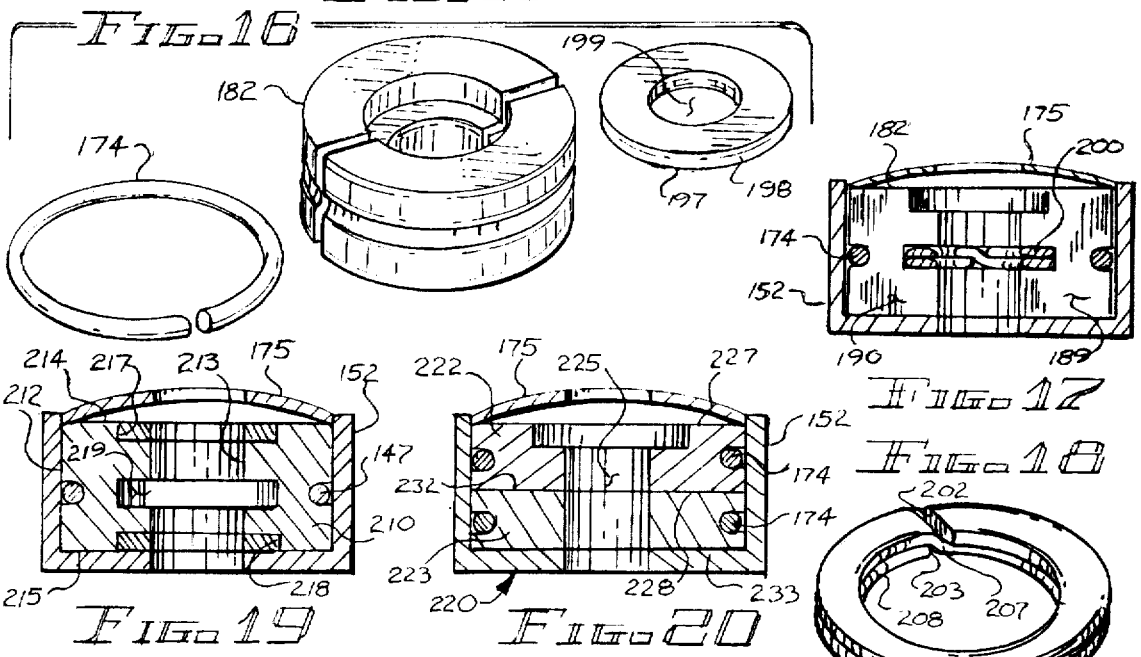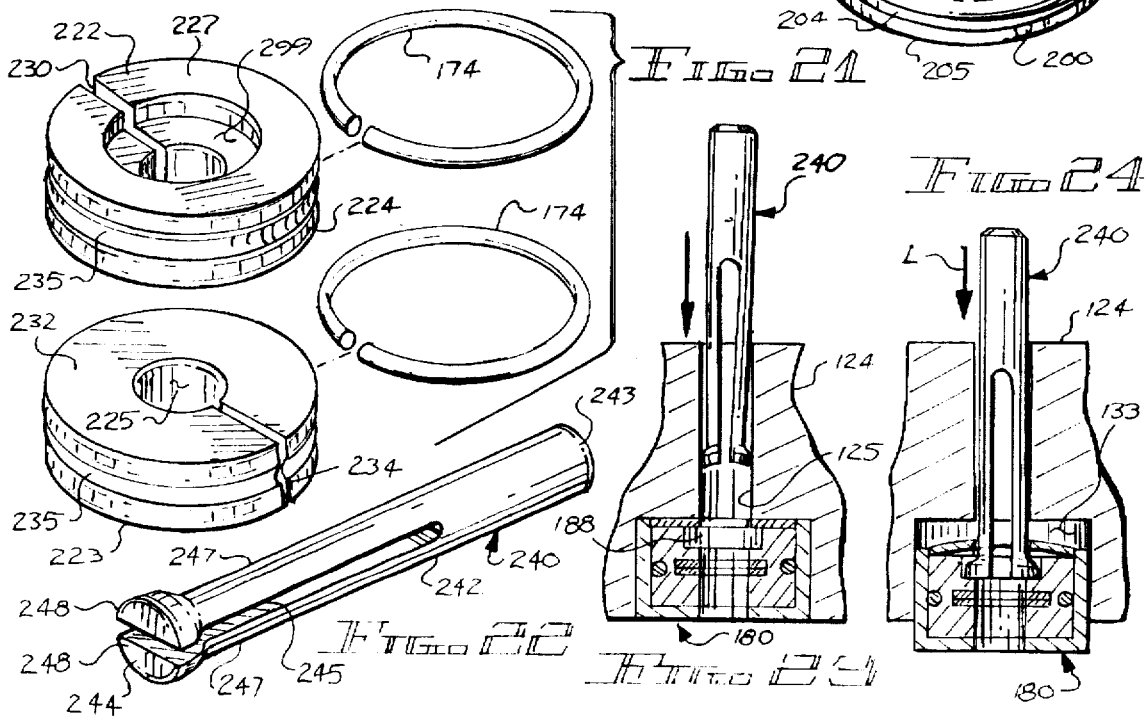

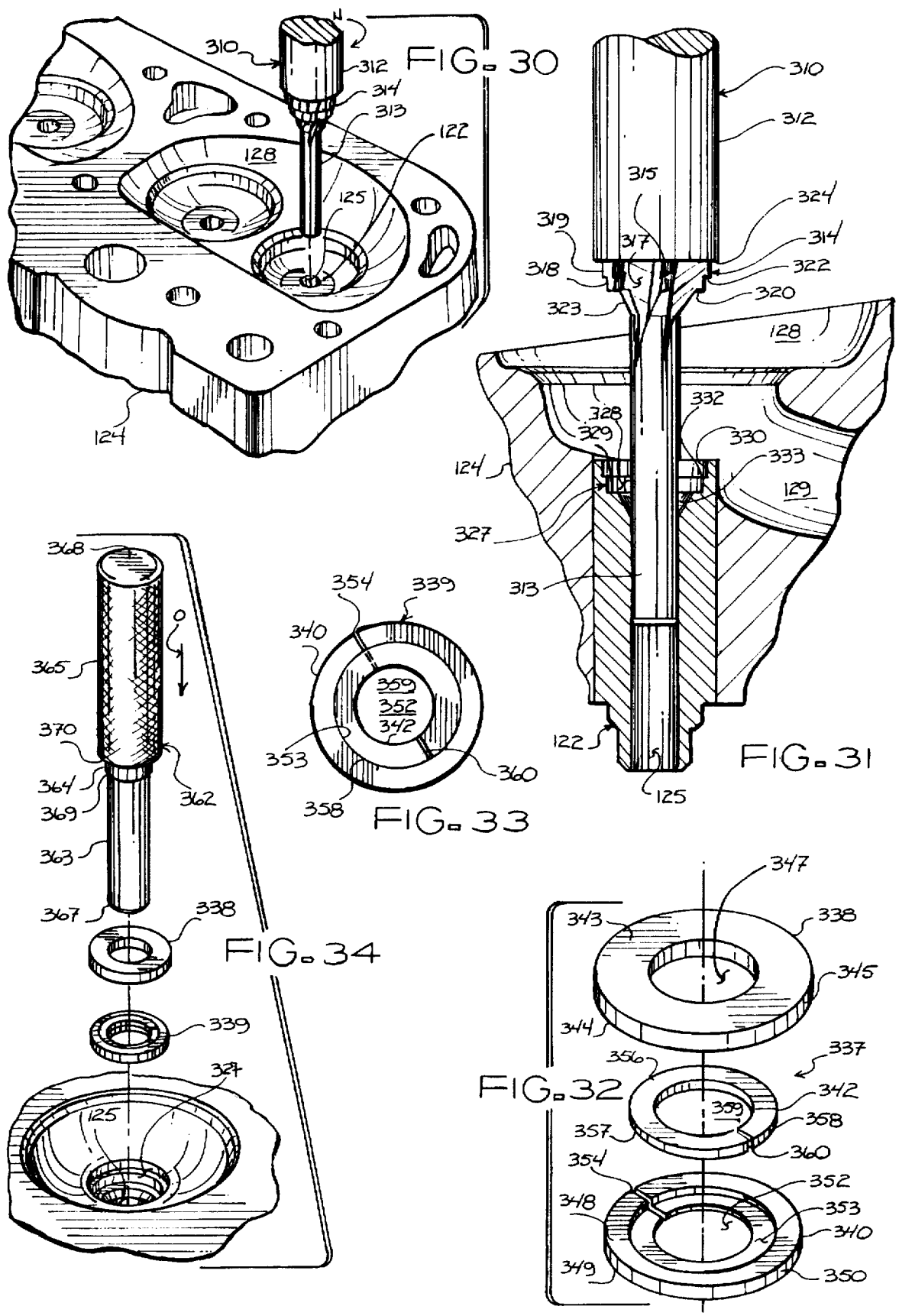

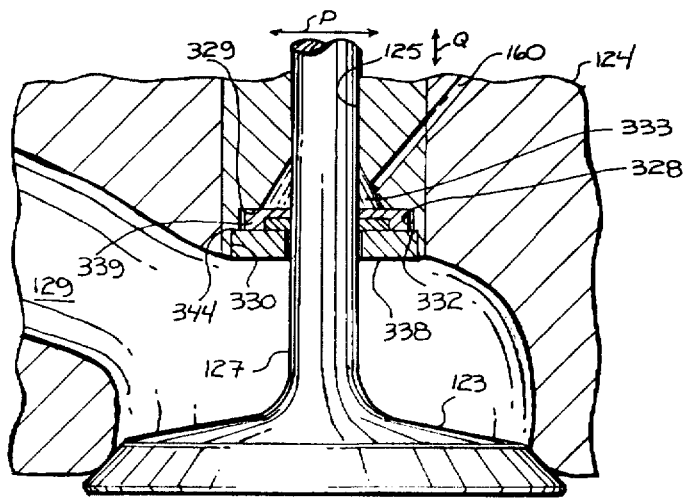
FIG. 35
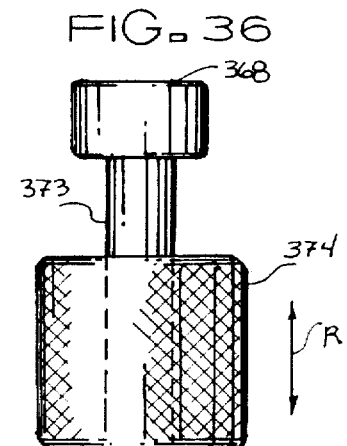
FIG. 36
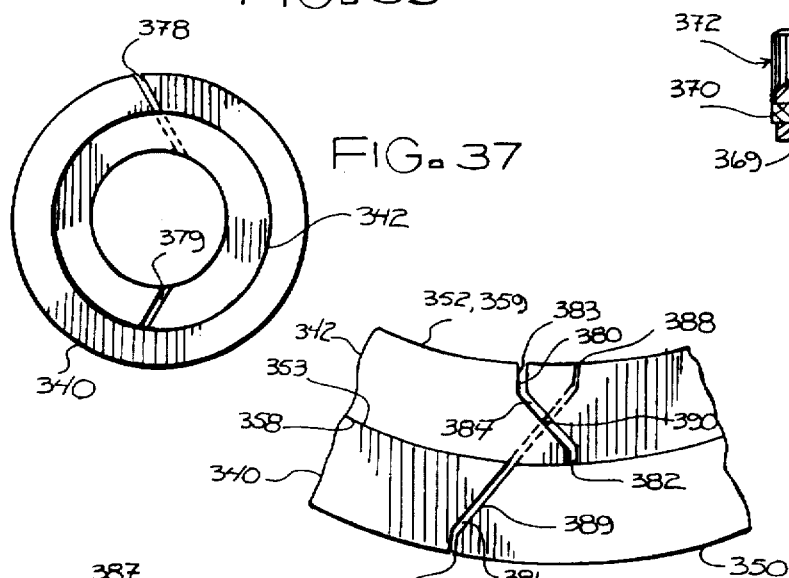
FIG. 37
FIG. 39
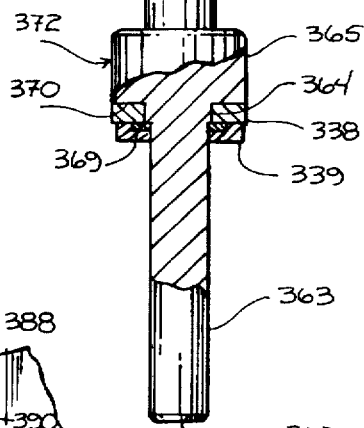
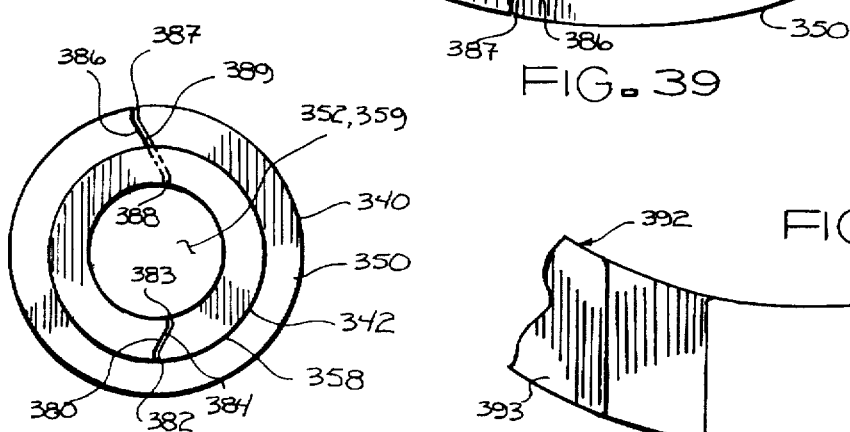
FIG. 38
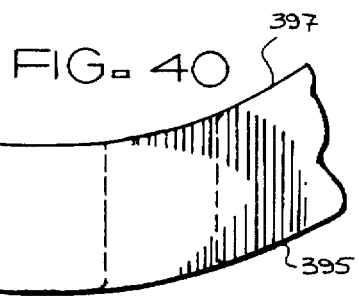
FIG. 40
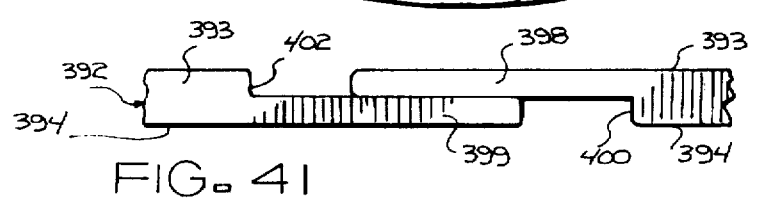
FIG. 41

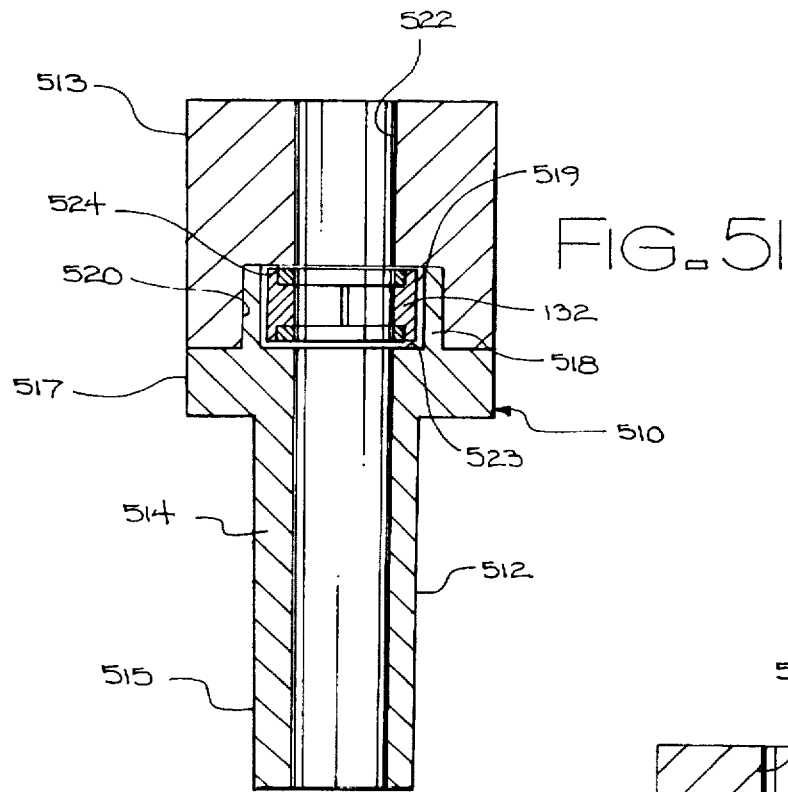
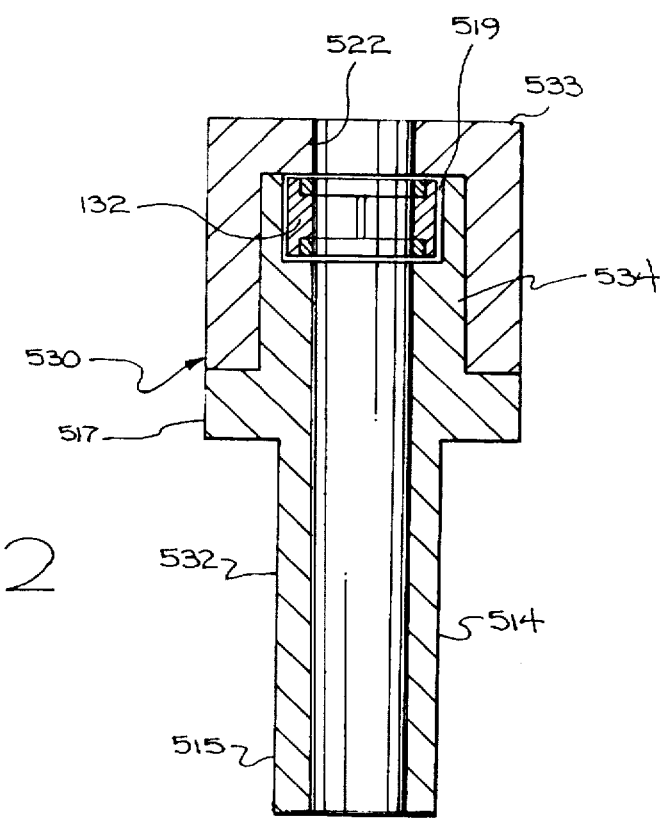

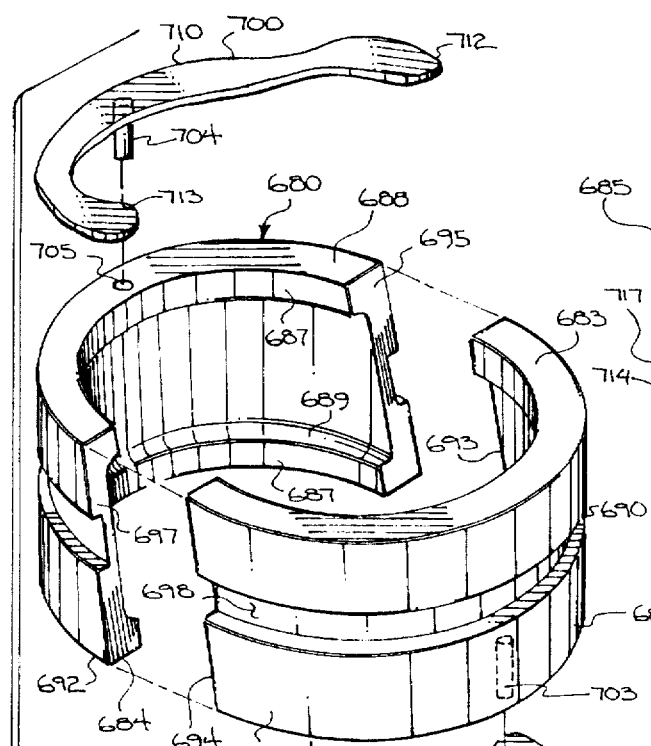
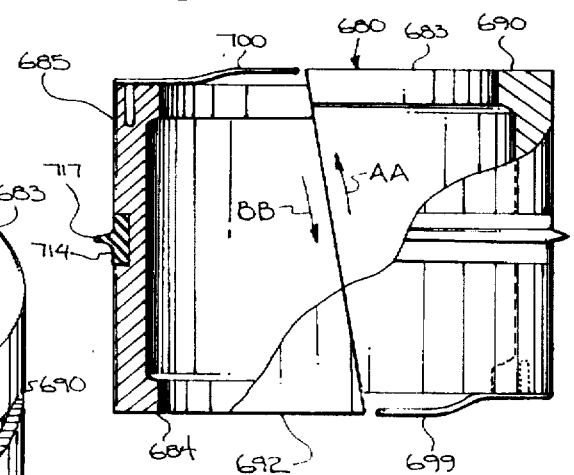
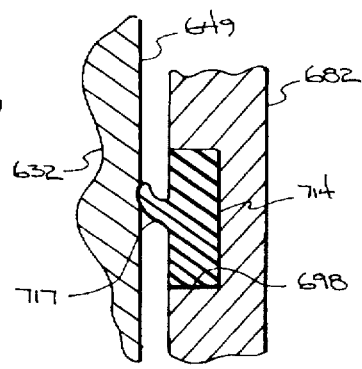
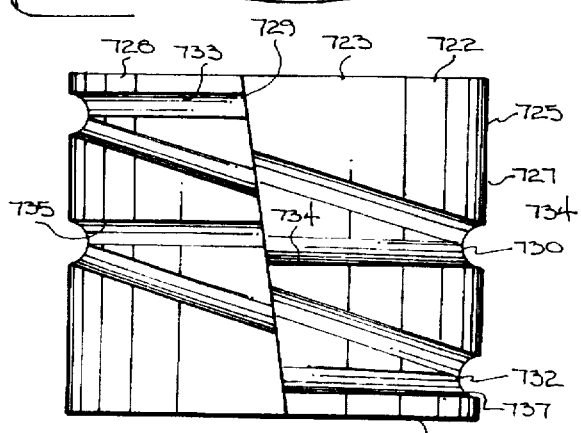
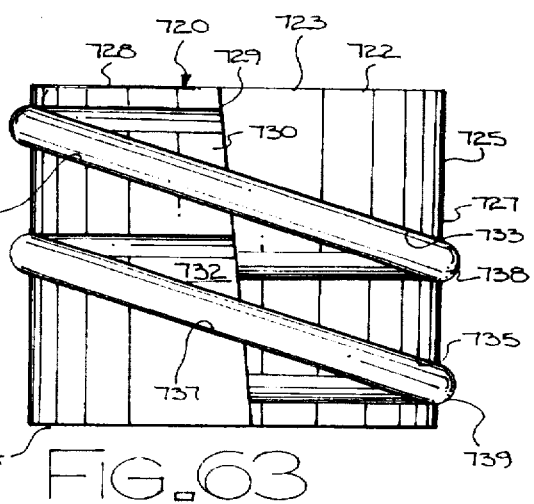

SEAL APPARATUS

CROSS REFERENCE TO RELATED APPLICATIONS

The application is a division of application Ser. No. 08/111,371, filed 23 Aug., 1993 now U.S. Pat. No. 5,618, 048, which is a Continuation-In-Part of the common inventors prior filed, application Ser. No. 07/774,054 entitled SEAL APPARATUS, abandoned filed 8 Oct. 1991, which in turn is a Continuation-In-Part of abandoned application Ser. No. 538,886, entitled SEAL APPARATUS, filed 18 Jun. 1990, which in turn is a Continuation-In-Part of abandoned application Ser. No. 267,542, entitled SEAL APPARATUS, filed 4 Nov. 1988, which in turn is a Continuation-In-Part of abandoned application Ser. No. 172,657, entitled SEAL ASSEMBLY, filed 24 Mar. 1988.

BACKGROUND OF THE INVENTION

1. Field of the Invention

This invention relates to seals.

More particularly, the present invention relates to annular seals of the type especially adapted for use in connection with a mechanism having linearly or reciprocally movable members.

In a further and more specific aspect, the present invention concerns a seal apparatus having improved means for minimizing fluid leakage between the members and through the seal.

2. Prior Art

Various mechanical apparatus include first and second members which are substantially coaxial and disposed for relative reciprocal movement. Exemplary are internal combustion engines, positive displacement pumps, pneumatic motors and other mechanical devices incorporating a piston and cylinder assembly. Further examples will readily occur to those skilled in the art.

Commonly, the cylinder is defined by a bore having a cylindrical sidewall. The piston, a generally cylindrical member, includes a sidewall and a top. An end wall or head, opposing the top of the piston, closes one end of the bore. A chamber of variable capacity is defined within the bore between the head and the top of the piston.

Pressurized fluid functions within the chamber. In an internal combustion engine, the fluid is the expanding gases of combustion which serve to propel the piston downwardly or away from the head. Pressurized fluid from an external source is introduced into the chamber of a pneumatic motor to force movement of the piston. In a pump, which is companion to the engine and to the pneumatic motor, fluid is compressed and pressurized within the chamber.

In order to provide for relative movement between the members, it is necessary that the diameter of the piston be of lesser dimension than the diameter of the bore. Frequently, substantial clearance is required. For example, it is well known that a piston is more sensitive to thermal expansion than is a cylinder. Accordingly, where heat is a factor, such as in an internal combustion engine, additional space must be provided between the sidewall of the bore and the sidewall of the piston to accommodate thermal expansion of the piston. The space, commonly referred to as sidewall clearance, is generally in the range of fifteen ten-thousandths of an inch to five one-thousandths of an inch, or greater.

For reasons which are immediately apparent to those having an appreciation for the art, it is necessary that the piston be sealed to the cylinder. Conventionally, this is accomplished by a device commonly referred to as a piston ring, an annular seal usually fabricated of metal such as cast iron and having a generally rectangular cross-section. The ring is received within a mating annular ring groove formed into the sidewall of the piston. To facilitate expansion during installation, and for other reasons, the ring is radially severed.

The spacing between the opposed ends of the severed ring, known as the end gap, serves various functions after installation. Having an inherent tendency to expand, the ring maintains tension for attendant sealing against the sidewall of the cylinder as the bore increases in diameter as a result of wear. The end gap also allows for thermal expansion of the ring resulting from heat generated by friction, compression of fluid, combustion of fuel and other sources.

Although necessary and even beneficial, the end gap is also the source of considerable concernment. Normal end gap clearance in a newly installed ring ranges from approximately ten one-thousandths of an inch to approximately forty one-thousandths of an inch. The end gap defines a path for leakage of fluids between the sidewall of the piston and the sidewall of the bore. Throughout the life of the device, the piston ring continuously expands as compensation for normal wear. Resultingly, the end gap ever increases with corresponding increase in leakage, usually referred to as a blow-by.

Efficiency, economy and service life of the apparatus is directly related to blow-by. In general, less than optimum output of the apparatus results from loss of pressure or compression of the fluid. Other deleterious effects are unique to the particular apparatus. In an internal combustion engine, for example, contaminating by-products of combustion suspended in the blow-by gases are carried into the lubricating system which in turn harms components throughout the engine.

In recognition of the desirability of enhancing the seal between the piston and the cylinder, the prior art has proposed various seals which purportedly reduce or eliminate blow by. Several prior art proposals are direct at attempts to eliminate the end gap in the conventional piston ring. Various proposals include an insert which spans the end gap and is received in a notch formed into the ring on either side of the end gap. Other proposals include the use of a relatively thin steel member, alternately named a ribbon member or a gap seal member, having a substantially rectangular cross-section. Also advanced is a plurality of severed annular members, installed in stacked arrangement with staggered end gaps. The prior art has also advocated the use of thin steel members, colloquially dubbed rails, in combination with ring members having a general resemblance to conventional piston rings. Being of substantially heavier construction than a rail and usually fabricated of malleable material, such as cast iron, the ring member is variously referred to as a packing member or a sealing ring. The ring member in combination with the rail member comprise a seal assembly of which various embodiments are known.

In accordance with one known arrangement the rail resides within an annular groove formed into the inner circular wall of the seal member and exerts outwardly directed radial pressure to hold the seal member in contact with the sidewall of the bore. In another configuration, the rail occupies a space between the top of the seal member and the upper radial surface of the containing ring groove. Still other formations orient the radial axis of the rail at an angle.

For various reasons, annular seals of the foregoing character are not perceived as being entirely satisfactory. For example, in an assembly wherein the rail resides within the seal member and exerts an expansive force, excessive friction is generated against the sidewall of the bore. Where only the rail contacts the sidewall, seating or breaking-in of the seal is substantially retarded or even prohibited. An angled rail is subject to vibration, commonly known as ring flutter, when used in connection with a rapidly reciprocating piston. A thin steel member exposed to extreme heat, such as when utilized as the top compression ring in an internal combustion engine, will be become distorted.

Seal assemblies of the above character where devised mainly during the time period ranging from approximately the middle nineteen thirties to early nineteen fifties. During the early nineteen seventies, there was developed a seal assembly which substantially remedied the foregoing deficiencies inherent in the prior art. Distributed by POWERFORMANCE INTERNATIONAL CORPORATION under the trademark TOTAL SEAL®, the seal assembly has achieved commercial success, especially for use in connection with four-cycle internal combustion engines.

Briefly, the Total Seal® device, referred to as a ring set, includes a sealing ring member and a gap seal member. The sealing ring member, a severed annular member preferably fabricated of malleable metal such as cast iron, has thickness and radial dimensions to be received within a conventional piston ring groove in accordance with standard tolerances. Extending inwardly from the outer cylindrical surface along the underside of the sealing ring member is an annular notch in which is received the gap seal member. The intricacies and advantages of the ring are described in U.S. Pat. No. 3,811,690 and are well known to those having regard for the art.

Notwithstanding continuing success in the trade, the Total Seal® ring set has proven to be less than optimum. As installed, the respective end gaps of the sealing ring member and of the gap seal member are diametrically opposed. The elastic expansiveness or outward radial force of a severed annular seal under tension is gradiently distributed throughout. Therefore, while the set as an assembly is free to move or work within the ring groove, theoretically, movement between the members should be prohibited as the result of the relative forces therebetween.

Extensive use in testing has shown that occasionally relative movement will occur between the members. The ultimate relative movement is capable of aligning the respective end gaps. While the other advantages of the set remain, leakage can occur.

Considerable research and development has been directed to devising a ring set which will retain the numerous benefits of the present Total Seal® ring set and yet provide additional benefits and resolve other problems of long-standing in the art. Substantial attention has been directed to an assembly in which the possibility of leakage is minimized. Additional efforts were directed to ameliorating the advantages of the ring set in such areas as reducing generated heat and increasing ring stability. Further consideration has been given to extending the utility of the assembly for use in additional applications, including internal combustion engines having sleeve or port valves and to making practical a piston having a single compression ring.

A foregoing investigation was particularly concerned with a seal assembly to be carried by a reciprocally movable member for sealing engagement with the bore within which the member is disposed. Once the problem solving efforts were set in motion, attention was directed to allied mechanical apparatus having members disposed for relative reciprocal movement. Especially considered was the converse yet correlative, subject of a seal assembly for sealing engagement with the movable member.

Exemplary, and chosen for purposes of extended research and development, is the valving apparatus of a conventional internal combustion engine. As will be appreciated by those skilled in the art, the assembly includes a valve having a shaft or stem which is movably disposed within a bore or valve guide carried by the head. The upper end of the shaft projects beyond the bore to reside within an oil ladened environment. The lower end of the shaft similarly projects beyond the end of the bore and communicates with the combustion chamber.

The typical internal combustion engine includes an intake valve assembly and an exhaust valve assembly. In response to normal engine operation, the assemblies are subject to forces which tend to cause the flow of fluids between the stem and the bore. During the intake cycle, during which the intake valve is open and a vacuum exists within the combustion chamber, a tendency exists for oil to be drawn through the assembly. During the exhaust cycle, during which the exhaust valve is open and the combustion chamber is pressurized, the tendency exists for exhaust gases to escape between the bore and the shaft.

It is apparent from the foregoing that sealing the valve assembly is an area of urgent concern. The prior art, however, has not provided satisfactory solution. Consistent with a teaching of the prior art, fluid flow is minimized by closely fitting the shaft within the bore. However, due to normal wear the clearance between the shaft and the bore ever increases resulting in progressively worsening blowby. As a purported solution, the prior art has provided valve seal devices which are secured to the upper end of the valve guide. While wear is of a lesser concern, such seal devices prevent adequate lubrication of the assembly.

It would be highly advantageous, therefore, to remedy the foregoing and other deficiencies inherent in the prior art.

Accordingly, it is an object of the present invention to provide improved means for sealing between a pair of coaxial components having relative reciprocal movement therebetween.

Another object of the invention is the provision of improved sealing means especially adapted for use in connection with internal combustion engines, positive displacement pumps, linear fluid actuated motors and other apparatus having a bore encircling a piston, shaft or other reciprocally movable component.

And another object of this invention is to provide an improved annular seal of the normally severed type as exemplified by the conventional piston ring.

Still another object of the invention is the provision of a seal assembly having ameliorated means for materially reducing the possibility of leakage between the bore and the reciprocally movable member.

Yet another object of the immediate invention is to provide a seal assembly having rapid seating or break-in characteristics.

And yet another object of the invention is the provision of a seal device which will provide excellent sealing with substantially reducing friction.

And a further object of the instant invention is to provide a seal device having an extended service life.

Still a further object of this invention is the provision of a seal device which is easily installed with prior art skills and tools.

5

Yet a further object of the invention is to provide a seal device which is readily produced in accordance with known manufacturing techniques.

And still a further object of the invention is the provision of a seal device according to the foregoing which is adapted for use in mechanisms having an opening in the sidewall of the bore.

And yet a further object of the invention is to provide improved means and method for lubricating an assembly while maintaining a seal between the relatively movable components.

SUMMARY OF THE INVENTION

Briefly, to achieve the desired objects of the instant invention in accordance with a preferred embodiment thereof, there is provided a first annular member and a second annular member comprising a seal assembly to be received within an annular groove having opposed radial surfaces and carried by one of a pair of reciprocally movable members for sealing engagement with the sidewall of the other of the pair of reciprocally movable members. Each of the annular members includes first and second radial surfaces and a contact surface. The first radial surface of the first annular member resides adjacent one of the radial surfaces of the groove while the second radial surface of the second annular member resides adjacent the other of the radial surfaces of the groove. Each contact surface is engagable with the sidewall of the respective reciprocally movable member. The first and second annular members are severed by first and second end gaps, respectively. At least one of the end gaps extends along an axis which is angularly disposed to an intercepting radius of the respective member.

In accordance with a further embodiment of the invention, the other end gap also extends along an axis which is angularly disposed to intercept a radius of the other annular member. When viewed as an assembly with the respective radii aligned, the axis of the first end gap and the axis of the second end gap are divergent. Preferably, each axis is angularly disposed to the respective radius at an angle in the range of 15° to 45°.

It is also contemplated by the instant invention that the end gap in at least one of the members be effectively eliminated. In accordance with an embodiment thereof, the members provided with overlapping and inner segments. Thus formed are two spaced apart end gaps, each extending inwardly from opposite radial surfaces for a defined portion of the axial thickness of the member.

In a still further embodiment, one of the annular members includes an annular notch having a radial surface extending from the contact surface thereof and an axial surface extending from a radial surface thereof. The other of the annular members is sized to be received within the annular notch. In an even more specific embodiment, each end gap defines a pair of spaced apart ends carried by the respective annular member. At least one of the annular members includes a relieved terminal portion extending from each of the pair of spaced apart ends along the contact surface. It is preferred that each terminal portion is arcuately inturned with respect to the contact surface.

According to yet another embodiment of the invention, there is provided a seal means preferably in the form of a seal assembly having first and second annular seal members each having a bore with a contact surface engageable with a shaft. Also provided are retention means for retaining the seal assembly in coupled engagement with a counterbore formed into the body having the bore in which the shaft is movably disposed. In a specific embodiment, the retention means may be in the form of a carrier member positionable within the counterbore and having a cavity therein for containing the seal assembly. The carrier member may be retained within the counterbore by friction or, alternately, by a mechanical retainer means such as a snap ring.

Alternately, the seal means are receivable within a pocket formed into the body coaxial with the bore and forming a first radial shoulder therewith. A retention means are engageable within a receptacle formed into the body and forming a second radial shoulder with the pocket. Preferably, the seal means is moveable within the pocket to accommodate lateral movement of the shaft while maintaining sealing engagement therewith. The retention means bears against the second radial shoulder and is retained within the receptacle by friction or other known means such as staking. The distance between the first and second shoulders, which define the limits of axial reciprocal movement of the shaft, is limited to a distance less than required for seal flutter.

According to a yet further embodiment of the invention, motion retarding means are provided to prevent longitudinal movement of the seal assembly. A preferred motion retarding means includes biassing means intermediate the seal assembly and the end wall of the counterbore for urging the assembly against the end wall of the carrier member. Each of the members are severed by an end gap. The first or outer member may be further severed into first and second sections by a second end gap. The elements are held in annular alignment by an encircling coupling means which exerts an inwardly directive compressive force to urge both of the members into sealing engagement with the shaft.

Also provided by the instant invention is a tool for removing a seal device comprising a seal assembly and a carrier member from the counterbore. The tool includes an elongate shank receivable through the bore and having a radially extending projection which is movable between a retracted position for passage through the bore and an extended position to be received against the seal device. The first seal member may be provided with a recess for receiving the projections of the tool. Preferably, the tool includes a pair of legs, each carrying a projection. Expansion means may be provided for urging the legs outwardly to place the projections in the extended position.

Further provided by the instant invention is a seal assembly for use in combination with a main body and a shaft moveably carried and extending through an opening in the main body for controlling flow of a fluid through the opening. The seal body, receivable within a recess in the opening includes an axial bore for sealingly engaging the shaft. The seal body is divided into first and second segments along a plane angularly displaced from the longitudinal axis of the seal body and passing through the ends thereof. The segments are abutted in sliding contact. Biasing means urge the segments in mutually convergent axial and radial directions to maintain the bore in sealing engagement with the shaft.

BRIEF DESCRIPTION OF DRAWINGS

The foregoing and other objects, features and advantages of the instant invention will become readily apparent to those skilled in the art from the following detailed description of preferred embodiments thereof, taken in conjunction with the drawings in which:

FIG. 1 is a fragmentarily horizontal sectional view taken along the ring groove of a typical reciprocating mechanism and especially showing a commercially successful prior art seal assembly installed therein;

FIG. 2 is a plan view of a seal assembly constructed in accordance with the teachings of the instant invention;

FIG. 3 is a fragmentary vertical sectional view of the mechanism of FIG. 1 and having the seal assembly of FIG. 2 installed therein;

FIG. 4 is an enlarged view generally corresponding to the view of FIG. 1 and showing the seal assembly of FIG. 2 in plan as it would appear when installed therein;

FIG. 8 is a vertical sectional view taken along the longitudinal axis of a typical valve assembly of a conventional internal combustion engine and showing a seal device constructed in accordance with the teachings of the instant invention as it would appear when used to seal the valve stem to the bore of the valve guide;

FIG. 9 is an enlarged view of the seal device as seen in FIG. 8;

FIG. 10 is an exploded perspective view of the seal device of FIG. 8;

FIG. 11 is a view generally corresponding to the view of FIG. 9 and showing an alternate embodiment thereof;

FIG. 12 is an exploded perspective view, partly broken away, of the embodiment seen in FIG. 11;

FIG. 13 is a view generally corresponding to the view of FIG. 9 showing yet another embodiment thereof;

FIG. 14 is an exploded perspective view of yet another seal device incorporating the principles of the instant invention;

FIG. 15 is a vertical sectional view taken along the longitudinal axis of the assembled seal device as seen in FIG. 14;

FIG. 16 is an exploded perspective view of yet another embodiment of the instant invention;

FIG. 17 is a view generally corresponding to the view of FIG. 15 and showing an alternate embodiment thereof;

FIG. 18 is a perspective view of a seal member usable in connection with seal device of the instant invention;

FIG. 19 is a view generally corresponding to the view of FIG. 17 and showing an alternate embodiment thereof;

FIG. 20 is a view generally corresponding to the view of FIG. 17 and showing yet another embodiment thereof;

FIG. 21 is an exploded perspective view of the seal device of FIG. 20;

FIG. 22 is a perspective view of a tool especially adapted for removing a seal device such as seen in FIG. 8;

FIG. 23 is an elevational view of the tool of 22 as it would appear during an initial stage of removing a seal device of the instant invention, the seal device and environment being shown in vertical sectional view;

FIG. 24 is a view generally corresponding to the view of FIG. 23 and illustrating the tool as it would appear during the removal of the seal device;

FIG. 30 is a partial perspective view of a forming tool, constructed in accordance with the teachings of the instant invention as it would appear during use for forming a recess into a body, herein specifically illustrated as the head of a conventional internal combustion engine, for receiving a seal apparatus of the instant invention;

FIG. 31 is an enlarged fragmentary vertical sectional view taken along the longitudinal axis of the bore seen in FIG. 30 and further illustrating the forming tool and the recess formed thereby;

FIG. 32 is an exploded perspective view of a seal apparatus, including a seal assembly and a retainer constructed in accordance with the teachings of the instant invention, for insertion into the recess seen in FIG. 31;

FIG. 33 is a top plan view of the assembled seal assembly of FIG. 32;

FIG. 34 is an installation tool of the instant invention as it would appear during use for installing the seal apparatus of FIG. 32 into the recess seen in FIG. 31;

FIG. 35 is a view generally corresponding to the view of FIG. 31 and especially showing the seal apparatus of FIG. 32 as it would appear when inserted into the recess and sealing the stem of a valve;

FIG. 36 is an elevational view, partly in section, of an alternate installation tool-of the instant invention;

FIG. 37 is a view generally corresponding to the view of FIG. 33 and showing an alternate embodiment of the seal assembly thereof;

FIG. 38 is a view generally corresponding to the view of FIG. 33 and showing another embodiment thereof;

FIG. 39 is an enlarged fragmentary view of a portion of a seal assembly seen in FIG. 38;

FIG. 40 is an enlarged fragmentary view of one of the members of the seal assembly of FIG. 39 and showing another embodiment thereof;

FIG. 41 is a side elevation view corresponding to the view of FIG. 40;

FIG. 51 is a view generally corresponding to the illustration of FIG. 50 and showing an alternate guide assembly;

FIG. 52 is a view generally corresponding to the illustration of FIG. 51 and showing an alternate embodiment thereof;

FIG. 59 is an exploded perspective view of an alternate seal assembly especially devised for sealing a shaft extending through an opening in a main body;

FIG. 60 is a side elevational view of the embodiment of FIG. 59 as it would appear when assembled, a portion thereof being broken away for purposes of illustration;

FIG. 61 is an enlarged fragmentary portion taken from the illustration of FIG. 60;

FIG. 62 is a side elevational view of the seal body portion of yet another embodiment of the instant invention;

FIG. 63 is a view generally corresponding to the view of FIG. 62 and further having biasing means associated therewith;

DETAILED DESCRIPTION OF THE PREFERRED EMBODIMENTS

Figure 5:
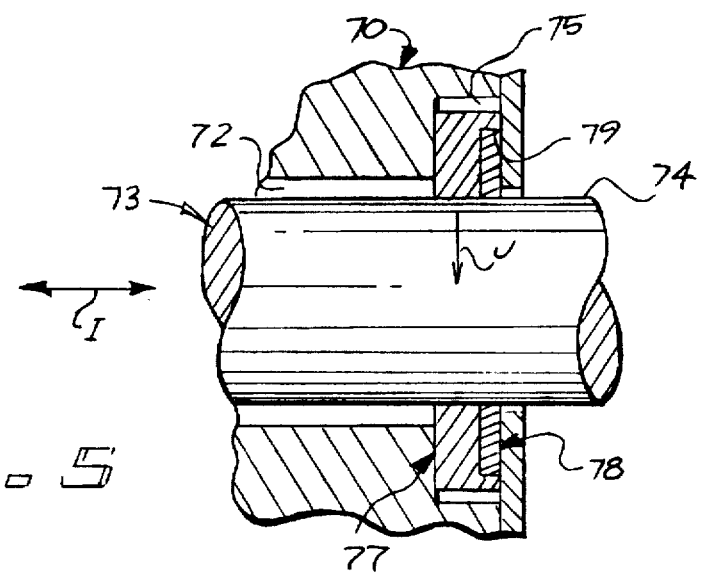
FIG. 5 is a vertical sectional view of an alternate embodiment of the invention as it would appear in combination with a mechanical apparatus being viewed in fragmentary sectional illustration.

Turning now to the drawings, in which like reference characters indicate corresponding elements throughout the several views, attention is first directed to FIG. 1 which shows a mechanism including a first member, generally designated by the reference character 20 and a second member, generally designated by the reference character 22, which are disposed for relative reciprocal movement along a linear axis which is substantially perpendicular to the plane of the illustration. The mechanism is typically representative of internal combustion engines, positive displacement pumps, linear fluid actuated motors and similar apparatus in which first member 20 is generally referred to as the cylinder and second member 22 is usually referred to as the piston. First member 20 includes inner cylindrical sidewall 23 which is coaxial with and spaced from outer cylindrical sidewall 24 of second member 22. The space, commonly termed sidewall clearance and herein exaggerated for purposes of illustration, is necessary to ensure relative movement between the members. To retard leakage, the second member 22 is provided with an annular groove 25, commonly known in the art as a ring groove, for the purpose of carrying sealing means. The traditional sealing means is the conventional piston ring.

Chosen for purposes of illustration is the sealing means set forth in U.S. Pat. No. 3,811,690 and commercially distributed by POWERFORMANCE INTERNATIONAL CORPORATION under the trademark TOTAL SEAL®. The Total Seal® device, actually an assembly, includes a sealing ring member and a gap seal member generally designated by the reference characters 27 and 28, respectively. Sealing ring member 27, preferably fabricated of malleable metal such as cast iron, has thickness and radial dimensions to be received within groove 25 in accordance with standard tolerances. Analogous to the conventional piston ring, sealing ring member 27 is severed by end gap 29 and has a sealing surface 30 which engages cylindrical sidewall 23. Gap seal member 28, preferably fabricated of steel, is dimensioned to be received within a notch (not specifically shown) formed in the underside of sealing ring member 27. Gap seal member 28, similar to sealing ring member 27, is severed by end gap 32 and has sealing surface 33 which also engages sidewall 23.

The intricacies and advantages of the above described seal assembly are well known to those having regard to the art. Therefore, it will be appreciate that while the assembly is free to move or work within the ring groove, movement between the members should be theoretically prohibited as the result of the relative forces therebetween. Concern has been expressed, however, that it is possible for the end gap to align, substantially as illustrated in FIG. 1, and allow leakage of pressurized fluids through the seal.

The foregoing is set forth for purposes of orientation and understanding in connection with the ensuing description of the several embodiments of the instant invention. Aspects not fully described will be readily apparent and appreciated by those skilled in the art.

The instant invention provides improvements to the above described seal assembly, and to similar sealing means, whereby the possibility of leakage is minimized. In accordance with an embodiment of the immediate invention as illustrated in FIG. 2, there is provided a seal assembly including a first annular member generally designated by the reference character 40 and a second annular member generally designated by the reference character 42. The assembly is dimensioned to be received within the conventional ring groove 25 as illustrated in FIG. 3. For additional reference, it is noted that annular groove 25, which is generally rectangular in cross-section, includes first radial surface 35, second radial surface 37, and axial surface 38. The relative movement between members 20 and 22 occurs in linear directions represented by the double arrowed line A which is parallel to the surface 23.

First annular member 40, which is preferably fabricated of a malleable material such as cast iron, includes first radial surface 43, second radial surface 44, outer axial surface 45 and inner axial surface 47. First radial surface 43 of annular member 40 resides adjacent first radial surface 35 of groove 25. Outer axial surface 45 functions as a contact surface capable of sealing engagement with inner sidewall 23 of first member 20. Annular notch 48 formed into first member 40 and being generally rectangular in cross-section is defined by radial surface 49 extending inwardly from outer axial surface 45 and axial surface 50 extending inwardly from radial surface 44. End gap 52 severs first annular member 40 and defines spaced apart ends 53 and 54.

Second annular member 42, in general analogy to first annular member 40, includes first radial surface 55, second radial surface 57, outer axial surface 58 and inner axial surface 59. Preferably fabricated of carbon steel, second annular member 42 is dimensioned to be received within notch 48 with second radial surface 57 adjacent second radial surface 37 of annular notch 48. Outer axial surface 58, which functions as a contact surface capable of sealing engagement with surface 23 of member 20, is preferably chrome-plated for purposes of wear and reduction of friction. End gap 60 severs second annular member 42 and defines spaced apart ends 62 and 63.

End gap 52, and thus ends 53 and 54, lie along an axis represented by the broken line B which is disposed at an angle to the intercepting radius represented by the broken line C. The angle between axis B and radius C is represented by the reference character X. The reference character B represents the angular displacement between the axis represented by the broken line D, along which end gap 63 and ends 60 and 62 lie, and the intercepting radius represented by the arrowed line E. Alternately, it could be stated that the axis represented by the broken line B is oblique to a line which is tangent to the surface 45 at the point of intersection of axis B as represented by the broken line F. Similarly, the axis represented by the broken line D is oblique to the point of tangency line with surface 58 as represented by the broken line G. It is within the scope of the instant invention that, alternately, only one of the members include an end gap which lies along an oblique axis. The axis of the other may be radial.

First annular member 40 and second annular member 42 are coupled as an assembly and installed in groove 25 with the members orientated substantially as seen in FIG. 2. It is noted that end gap 52 of member 40 is diametrically opposed to end gap 60 of member 42. Each member is elastically expansive to exert an outward force against cylindrical sidewall 23. In accordance with the phenomenon well established in connection with the prior art assembly specifically described in FIG. 1, the forces act to prohibit relative movement between the annular members of the assembly. In the desired orientation, each annular member serves to seal or close the end gap of the other member thereby eliminating the fluid leakage path inherent in conventional prior art piston rings.

Should relative rotation occur between the members 40 and 42, the radii C and E could align as seen in FIG. 4. The orientation between the members illustrated in FIG. 4 is particularly chosen for purposes of illustrating the least effective positioning of the end gaps. The cross-sectional radial dimension, i.e. the length of the end gap, for piston rings normally used in automotive engines range from approximately one hundred and thirty one-thousandths of an inch to approximately one hundred and eighty one-thousandths of an inch for an average of approximately one hundred and fifty one-thousandths of an inch. Typically, the distance between ends, the width of the end gap, ranges from approximately ten one-thousandths of an inch in a new installation to approximately forty one-thousandths of an inch when worn. In the worst case as illustrated in FIG. 4 and assuming the angles X and B to be 45°, and end gap of ten one-thousandths of an inch would result in an aligned opening measuring ten one-thousandths of an inch by ten one-thousandths of an inch for a total of one ten-thousandths of an inch. For an end gap of forty one-thousandths of an inch, the opening would be sixteen ten-thousandths of an inch. Respectively, the openings represents 6.67 percent and 26.67 percent of the opening in a conventional piston ring. Alternately stated, even in the worst alignment configuration, the seal assembly of the instant invention is capable of reducing blow-by by between 73.33 percent and 93.33 percent.

First member 40 is generally L-shaped in cross-section and sized to be closely received within groove 25. In accordance with conventional practice the axial dimension, distances between surfaces 40 and 44, is approximately one one-thousandths to two one-thousandths of an inch narrower than groove 25. This clearance allows the ring assembly to move or work within the groove. In the embodiment chosen for purposes of illustration, the cross-sectional radial measurement, distance between surfaces 45 and 47, is approximately one hundred and forty one-thousandths of an inch, which is approximately six one-thousandths less than the distance between sidewall 23 and the inner surface 38 of groove 25.

Preferably, the cross-sectional dimensions of notch 48 are slightly larger than the cross-sectional dimensions of the second member 42. Continuing with the above example, the radial dimension of second member 42, the distance between surface 58 and surface 59, is approximately one hundred and five one-thousandths of an inch. The axial dimension of member 42 is approximately fifteen one-thousandths of an inch. The corresponding axial and radial dimensions of groove 25 range between five ten-thousandths and one one-thousandths greater than the dimensions of second member 42.

In accordance with the immediately preferred embodiment of the invention, the elastic expansiveness or outwardly directed radial force of each of the members, as indicated by the arrowed line H, is significant. Continuing the foregoing example, first annular member 40 exerts a total outward force of approximately ten pounds. The outwardly directed force of second member 42 is negligible. That is, second member 42 is substantially neutral and is in a relatively relaxed state when installed. The fabrication of annular seals having prescribed elastic expansiveness will be readily apparent to those skilled in the art.

Seating of the assembly, mating with the cylindrical sidewall of the bore, is an important consideration in the art. As initially installed, the seal assembly of the instant invention appears as illustrated in FIG. 3. It is noted that outer axial surface 45 of first member 40 and outer surface 58 of second member 22 are in contact with sidewall 23 of member 20. Accordingly, a space of approximately five ten-thousandths to one one-thousandths of an inch exist between inner surface 59 of second member 42 and the inner or axial surface 50 of notch 48. First member 40 is fabricated of a material which is relatively softer than the material of construction of second member 42. Preferably, first member 40 is fabricated of a malleable material such as cast iron nodular iron. Surface 45 may be coated with molybdenum or other facings conventional in the art. A preferred material for second member 42 is steel. Further, it is recommended that outer edge 58 be rounded in cross-section and coated with a friction reducing material such as chromium. Typically, the chrome plating may range between two one-thousandths and three one-thousandths of an inch.

Due to the inherent characteristics of first member 40, relatively soft material and tendency to expand, outer axial surface 45 is quickly worn away against surface 23 during initial operation. Accordingly, rapid wear-in or seating of the seal is accomplished. The seating phase continues until sufficient material is removed from surface 45 to allow inner surface 50 of notch 48 to abut the inner edge 59 of second member 42. The outwardly directed force of first member 40 is then transferred to second member 42. While surface 45 remains in contact with surface 23, the force against surface 23 is borne by outer edge 50 of second member 42. As a result of the arcuate shape of edge 58, the load bearing contact between the seal assembly and the bore is in the form of a parallel line. Accordingly, friction against surface 23 is vastly reduced as is wear of surface 45. To further reduce friction, it is suggested that edge 35 be chrome plated in accordance with conventional techniques to a thickness of approximately two one-thousandths of an inch to three one-thousandths of an inch.

Over the operating life of the apparatus considered from initial operation to normal time for rebuild, the diameter of sidewall 23 will enlarge by several one-thousandths of an inch and the seal assembly will decrease in diameter by a few one-thousandths of an inch. However, no loss in effectiveness of the seal assembly nor leakage between the members 20 and 22 will occur. As material is worn away, first member 40 will continue to expand to maintain the desired seal. Concurrent with the expansion of first member 40, end gap 52 will increase. Second member 42, however, will continue to function as an end gap seal member. It is noted that since only a small portion of second member 42 is exposed to the super-heated gases of combustion, no warpage or distortion will occur.

The foregoing embodiment of the invention is especially adapted to be carried by the inner one of a pair of coaxial reciprocally movable members for sealing against the cylindrical sidewall of the outer of the two members. Exemplary is the seal assembly held in the ring groove of a piston for sealing engagement with the sidewall of a cylinder in an internal combustion engine. It is contemplated by the instant invention to provide a seal assembly to be carried by the outer member and sealingly engage the inner coaxial member. Reference is now made to FIG. 5 wherein there is seen a first element 70 having bore 72 in which is disposed second member 73 having outer cylindrical sidewall 74. The members are disposed for relative reciprocal movement along a linear axis as suggested by the double arrowed line I. Exemplary of such an apparatus is the operating shaft extending from a linear hydraulic motor.

Annular groove 75 is formed into first member 70 from bore 72. The immediate embodiment of the seal assembly of this invention carried in groove 75 includes first annular member, generally designated 77, and second annular member, generally designated 78. Although not specifically described in detail, it is to be understood that the members 77 and 78 are analogous to the previously described members 40 and 42 except that the annular notch 79 extends outwardly from the inner axial surface of the first member and that the sealing function is accomplished by the inner axial surface of the first member and the inner axial surface of the second member. To complement the sealing function, the force generated by the first member is also reversed. That is, first member 77 is elastically contractive to display an inwardly directed radial force as represented by the arrowed line J. For a further understanding of the instant embodiment where not specifically described, reference is made to the embodiment described in detail in connection with the illustrations of FIGS. 2, 3, and 4.

Figure 6:
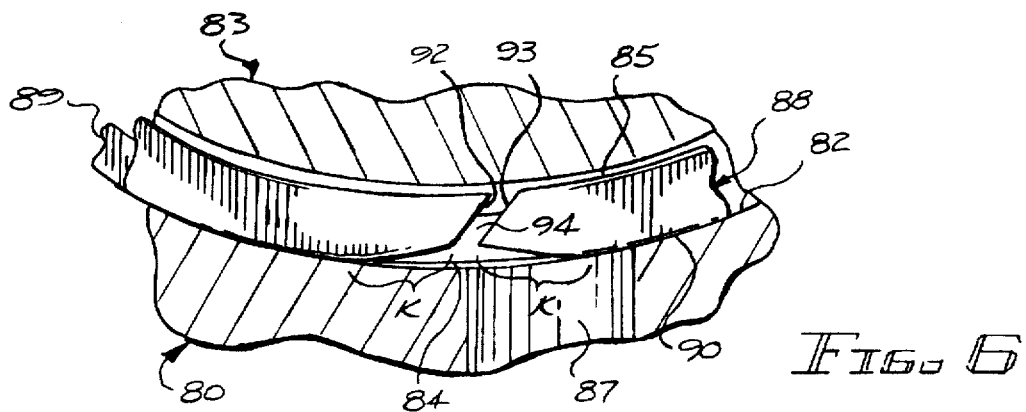
FIG. 6 is a view generally corresponding to the illustration of FIG. 6 and showing another embodiment of the instant invention.

In accordance with a further embodiment of the invention, there are provided means for sealing between first and second reciprocally movable members wherein an opening exists in one of the members. With reference to FIG. 6 there is seen such a mechanism, as for example a two-cycle engine, including first member 80, such as a cylinder, having inner cylindrical sidewall 82 and second member 83 having outer cylindrical sidewall 84 and annular groove 85. Opening 87, extends through first member 80 and outer cylindrical sidewall 82. A seal assembly embodying the principals of the instant invention and including first annular member 88 and second annular member 89 as previously described in detail reside within the groove 87.

As will be appreciated by those skilled in the art, opening 87 is alternately opened and closed in response to reciprocal movement of second member 83. During the relative reciprocal movement between the members, the seal assembly periodically passes over the opening 87 in sidewall 82. To accommodate opening 87, the terminal portions of outer axial surface 90 adjacent ends 92 and 93 of end gap 94 are relieved. Reference is made to the inturned terminal portions lying within the brackets designated by the reference character K. For purpose of illustration, the amount of inturn is exaggerated. The inturn prevents the terminal portion, especially the apexes between surface 90 and end 92 and between surface 90 and end 93, from entering the opening 87. In actuality, the inturn, measured at the ends 92 and 93 need by only three one-thousandths to four one-thousandths of an inch, slightly larger than anticipated wear of surface 90 during the service life of the seal assembly. Also the corresponding terminal portions of second annular member 89 are similarly relieved. While the relieved terminal portions are shown as being arcuate, other inturned geometric configurations will readily occur to those skilled in the art.

Figure 7:
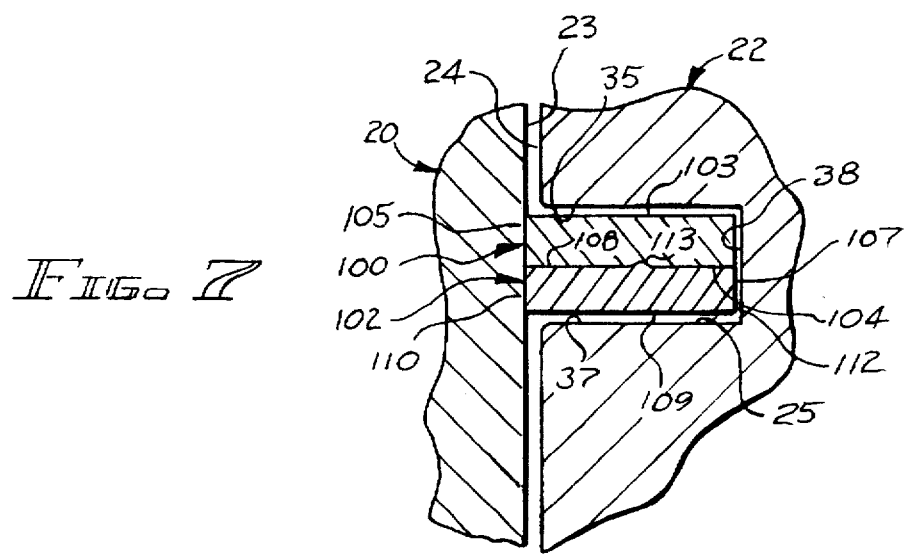
FIG. 7 is a view generally corresponding to the view of FIG. 4 and showing yet another seal assembly embodying the principals of the instant invention.

In the embodiments of the invention chosen for illustration thus far, the first and second annular members were of differing configuration which would suggest a primary member and a secondary member. The teachings of the instant invention are widely applicable to other seal assemblies as will be recognized by those skilled in the art. Turning now to FIG. 7 there is seen a seal assembly constructed in accordance with the teachings of the instant invention in which the annular members are identical but installed in reversed or mirror image orientation. For purposes of immediate reference, the members are designated first annular member 100 and second annular member 102. Member 100 includes first radial surface 103, second radial surface 104, outer axial surface 105, and inner axial surface 107. Similarly, second annular member 102 includes first radial surface 108, second radial surface 109, outer axial surface 110 and inner axial surface 112.

First radial surface 103 of member 102 resides adjacent first radial surface 35 of annular groove 25. Second radial surface 109 of second member 102 resides adjacent to the second radial surface 37 of groove 25. Second radial surface 104 of first member 102 resides in juxtaposition with first radial surface 108 of second member 102. Node 113 projecting upwardly from surface 108 and received within a mating socket formed in surface 104 functions as detente means to prevent relative rotation between the members.

References now made to FIG. 8 wherein there is seen a valve assembly, generally designated by the reference character 120, such as associated with the conventional internal combustion engine including valve guide 122 and valve 123. Carried by cylinder head 124, valve guide 122 includes bore 125 in which is reciprocally disposed stem or shaft 127 of valve 123. As will be appreciated by those skilled in the art, valve 123 controls fluid flow between combustion chamber 128 and port 129. It will be further appreciated by those skilled in the art that additional valve mechanism is located in the area 130, above head 124, and is heavily oil laden.

The foregoing description of valve assembly 120 is set forth here in in for purposes of orientation and reference in connection with the ensuing-detailed description of the instant invention. Further details, not specifically illustrated nor described, will be readily understood by those skilled in the art. For further reference, valve assembly 120 is considered to be generally representative of either an intake valve assembly or an exhaust valve assembly. It will also be appreciated by those skilled in the art that the foregoing description of a cylinder head and a valve assembly is intended to be typically representative of any body having a bore in which a shaft is moveably disposed. In accordance with the instant invention, there is provided a seal assembly, generally designated by the reference character 132 and held in counterbore 133 to seal shaft 127 to bore 125 and prevent the transfer of fluid between the areas 128 and 130. As will be readily understood by those skilled in the art, the pressurized gases of combustion tend to flow from the combustion chamber between the shaft and bore of an exhaust valve assembly. In an intake valve assembly, oil tends to flow between the stem and the bore into the combustion chamber in response to engine vacuum.

Seal device 132, as seen in greater detail with reference to FIGS. 9 and 10, includes a generally annular first seal member 134 having outer cylindrical surface 135, bore 137 and opposed radial end surfaces 138 and 139. Annular recesses 140 and 142 project inwardly from end surfaces 138 and 139, respectively. Alternately describable as counterbores, recesses 140 and 142 are contiguous with bore 137. Preferably fabricated of a metal such as cast iron or bronze which will exhibit the desired physical characteristics, annular seal member 134 is severed by end gap 143 as is conventional in the piston ring art.

Seal device 134 further includes a pair of identical second seal members 144. Being generally annular, each second seal member includes outer cylindrical surface 145, bore 147 and opposed radial end surfaces 148 and 149. Preferably fabricated of the same material as first member 134, or a harder material such as mild steel, second member 144 is severed by a conventional end gap 150.

Members 134 and 144 comprise a seal assembly which are held in carrier member 152, a cup-like member preferably fabricated of metal. Carrier member 152 includes continuous upright side wall 153 and end wall 154 having bore 155 therethrough. End 157 of carrier element 152 is open and provides access to the interior cavity 158.

The annular members 134 and 144 comprise a seal assembly which is receivable within cavity 158. Carrier member 152 is sized to be frictionally received and held within counterbore 133, as illustrated in FIG. 8. Bores 137 and 147 are sized to sealingly engage stem 127. To hold the surfaces of the bores in contact with the shaft and to compensate for wear, it is preferred that at least first member 134 be inherently elastically compressive. The fabrication of metallic members exhibiting an inherent inwardly directed force is well known to those skilled in the art. For maximum sealing efficiency, it is preferred that the end gaps 150 be angularly displaced from the end gap 143. Bore 155 through carrier member 152 is a clearance opening and does not contact shaft 127.

Seal device 123 provides an effective seal to retard or eliminate the travel of fluid between stem 127 and bore 125. Accordingly, it is possible to provide ameliorated means for lubricating shaft 127. In accordance with the immediately preferred embodiment of the invention, a groove 159 is formed into valve guide 122 along bore 125 from the adjacent oil laden area 130 to a location proximate and spaced from seal device 132. Passage 160 extending through head 124 communicates between the closed end of groove 159 and the area 130. As a result of the open end communicating with the area 130, oil is free to enter groove 159. Additional oil will be carried into bore 125 and groove 159 as a result of the reciprocal movement of stem 127. Excess oil and any air which may be present, will be vented through passage 160. For increased efficiency, it is preferred that groove 159 be helical.

Reference is now made to FIGS. 11 and 12 wherein there is seen an alternate seal device generally designated by the reference character 162 which includes previously described carrier element 152 and an alternate first seal member 163. Analogous to the previously described embodiment, first seal member 163 is generally annular and includes outer cylindrical surface 164, bore 165 and end surfaces 167 and 168. Recesses 169 and 170 receive the previously described second members 144 which have not been illustrated in FIG. 12 for purposes of clarity. In further similarity of the previously described embodiment, member 163 is severed by end gap 172.

First annular seal member 163 further includes annular groove 173 formed in to surface 164 for receiving severed ring member 174. Ring member 174 is inherently elastically compressive. That is, member 174 may be expanded to be received over surface 164 to be position within groove 173. Subsequently, the inherent inwardly directed force will exert a compressive influence upon the member 163 for purposes of sealing engagement between the surface of bore 165 and stem 127. The inwardly directed force is transmitted through the member 163 to the second members 144 for similar purposes. In accordance with the immediately preferred embodiment of the invention, the members 163 and 144 may be fabricated without an inherent tendency to compress since the compressive force will be supplied by ring member 174. Alternately, the members 163 and 144 may be fabricated as previously suggested and the member 174 being utilized to provide additional inwardly directed force.

Further provided by the immediate embodiment are motion retarding means to prevent reciprocal longitudinal travel or movement, usually rapid and commonly referred to as flutter, of the seal device in response to reciprocal movement of valve 123. For this purpose, there is provided biasing means specifically illustrated in the form of Belville washer 175. The structure and function of the Belville washer, commonly used as a thrust element, will be readily appreciated by those skilled in the art. As incorporated into the inmediate invention, washer 175 resides intermediate radial wall 177 between bore 125 and counterbore 133 and the end surface 167 of first seal member 163. Seal device 162 is installed into counterbore 133 such that washer 175 bears against radial wall 177 to exert a force upon surface 167 sufficient to urge surface 168 into continuous contact within wall 154 of carrier member 152. Alternately, washer 175 may be installed intermediate the seal assembly and the end wall of carrier member 152.

FIG. 13 illustrates yet another embodiment of the invention, generally designated by the reference character 178, which in general similarity to the embodiment designated by the reference character 162, includes carrier member 153, first seal member 163, ring member 174 and Belville washer 175. It is noted, however, that a second seal member 144 is carried only in the recess 170. Recess 169 is, therefore, free to receive a removable tool as will be described in detail presently.

FIGS. 14 and 15 illustrate an alternate seal device incorporating the principles of the instant invention and generally designated by the reference character 180. The immediate embodiment differs from the previously described embodiments by virtue of the alternate annular first seal member 182 which, however, in general similarity to the previously described embodiments includes outer cylindrical surface 183, bore 184 and end surfaces 185 and 187. In additional similarity, the seal member includes recess 188 formed into surface 185 and concentric with bore 184 and end gap 189. As modified, the immediate member is severed by an additional end gap 190, preferably diametrically aligned with end gap 189, into a generally semi-annular first seal element 192 and a mirror image second seal element 193. Recess 194, having dimensions corresponding to previously described recesses such as 144 and 170, resides at an intermediate location.

As specifically illustrated in FIG. 15, second seal member 144 is operatively carried in recess 194. Additionally, the immediate embodiment includes several previously described elements including carrier member 152, ring member 174 and motion retarding member 175. In all other aspects not specifically described, seal device 180 is the functional equivalent of seal device 162 previously described in detail. The compressive force for urging the surfaces of bores 184 and 147 into sealing engagement with a shaft is the result of the inherent characteristics of ring member 174.

FIG. 16 illustrates an alternate second seal member which is usable in combination with first seal member 182, ring member 174 and other elements previously described in detail in connection with FIGS. 14 and 15. Second seal member 197 having outer cylindrical surface 198 and bore 199 is sized to be received within recess 194 to be the functional equivalent of second member 144. In contrast to the second seal element 144, the immediate embodiment is endless and preferably fabricated of a compressible plastic material such as Teflon® or Nylon®.

FIGS. 17 and 18 illustrate yet another second seal member 200 which is alternately usable with first seal member 182 to provide the seal assembly of the previously described seal device 180. Preferably fabricated of relatively thin mild steel, member 200 is generally helical extending between ends 202 and 203. Preferably the member includes two coils 204 and 205 which are flattened to lie in parallel juxtaposition. The coils are joined by transition portion 207 which resides intermediate the ends 202 and 203. Innersurface 208 of the coils 204 and 205, the corollary of bore 147 of member 144, is preferably arcuate in cross section such that two line contacts are made with the mating shaft. Accordingly, seal to shaft friction is substantially reduced. The immediate embodiment provides the further benefit, as does seal member 197, of eliminating the end gap for more effective sealing.

An alternate first seal member 210 is illustrated in FIG. 19. In general similarity to each of the previously described first seal members, seal member 210 includes outer surface 212, bore 213 and end surfaces 214 and 215. Recess 217 extending inwardly from end surface 214 and recess 218 adjacent end surface 215 are sized to receive a second annular seal member as previously described. Additionally, the immediate embodiment includes recess 219 residing at an intermediate location and for purposes which will be presently described.

Turning now to FIGS. 20 and 21 there is illustrated an alternate seal device of the instant invention generally designated by the reference character 220. The immediate embodiment includes a seal assembly comprising complemental seal elements 222 and 223 which, taken together, bear a resemblance to a previously described first seal member having been radially divided. Taken together, the members share outer cylindrical surface 224 and bore 225.

Element 222 further includes radial end surfaces 227 and 228, recess 229 formed inwardly from end surface 227 and end gap 230 member 223 further includes radial end surfaces 232 and 233 and end gap 234. As an assembly, surfaces 228 and 232 lie in abutting juxtaposition. Groove 235 encircling each element receives a ring member 174. The members, preferably assembled with the end gaps angularly displaced, are held in previously described carrier member 152 and retained against the end wall thereof by motion retarding member 175. As with the previous embodiments, it will be understood that the upper edges of the side wall 153 of carrier member 152 may be deformed inwardly for captive retention of the member 175.

Referring now to FIG. 22 there is seen a tool, generally designated by the reference character 240 including shank 242 having first end 243 and second end 244. Slit 245 bifurcated a portion of shank 242 adjacent end 244 into a pair of legs 247. A projection 248 extends radially outward from each leg 247 proximate end 244. Especially adapted for removing a seal device such as described in connections with FIGS. 8–21, tool 240 is sized to be received through bore 125. For this purpose, legs 247 are inwardly compressible such that the included dimension of projections 248 are receivable through the bore 125 as specifically illustrated in FIG. 23. As tool 240 is inserted in the direction of arrowed line A, projections 248 passed through bore 125 and the opening in the motion retarding means or Belville washer 175 to be received within the recess 188. Once the projections are received within the recess 188, legs 247 are free to relax into the expanded position seen in 244 with projections 248 bearing against the lower surface of the recess as illustrated in FIG. 4. With additional force applied to tool 240, such as by a hammer, in the direction of arrowed line L, seal device 180 is dislodged and driven from the counterbore 133. While the seal device designated by the reference character 180 has been specifically chosen for purposes of illustration, it will be appreciated that a recess analogous to recess 188 has been provided in the alternate embodiments for the same purpose.

Figure 25:
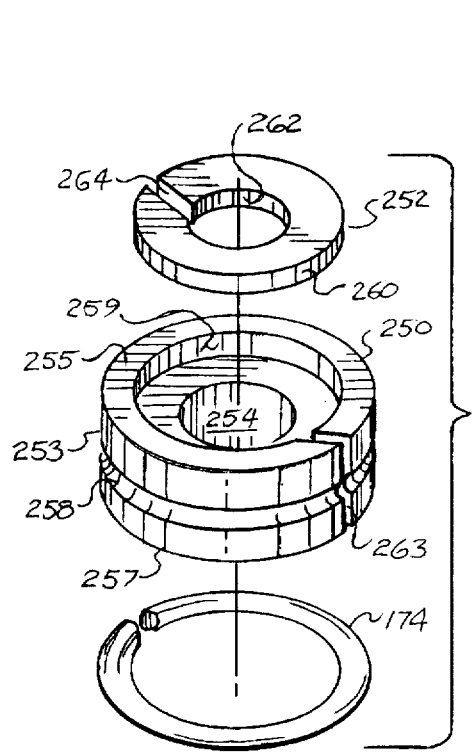
FIG. 25 is an exploded perspective view of yet a further embodiment of the instant invention.

Seen with reference to FIG. 25 is an alternate seal assembly including first seal member 250, second seal member 252, and ring member 174. In further analogy to the previously described embodiments, first seal member 250 includes outer cylindrical surface 253, bore 254 and first and second radial end surfaces 255 and 257, respectively. Further included is groove 258 for receiving ring member 174 and recess 159 for receiving second seal member 252. Similarly, second seal member 252 includes outer cylindrical surface 260 and bore 262.

End gap 263 severs first member 250 and end gap 264 severs second member 252. The end gaps 263 and 264, when viewed in plan, are oblique or angularly disposed to a radial line. As in accordance with the previously described seal devices, it is preferred that the end gaps of the respective members are approximately diametrically opposed during assembly. In the immediate seal device, it is further preferred that the angularly disposed end gaps are arranged such that should relative movement occur thereby bringing the end gaps into alignment, the end gaps will lie along oppositely disposed angles to a common radial line. For further description and understanding, attention is directed to the prior description associated with FIGS. 2–4.

Figure 26:
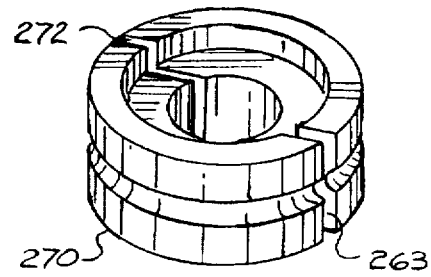
FIG. 26 is an exploded view of yet a still further embodiment of the instant invention.

First seal member 250 is severed by a single end gap analogous to the previously described first seal members 134 and 163. Previously described seal member 182 is severed by a pair of generally diametrically opposed end gaps. It is within the scope of the instant invention that a first seal member may be similarly severed by a pair of angularly disposed end gaps. A first seal member 270 embodying these principles is seen in FIG. 26. The member 270, which includes the elements previously described in connection with the member 250 including end gap 263 is further severed by end gap 272. The end gaps 263 and 272 each lie to opposite sides of a diametric line. Accordingly, each end gap 263 and 272 bears the same relationship to the end gap 264 of second member 252.

Figure 27:
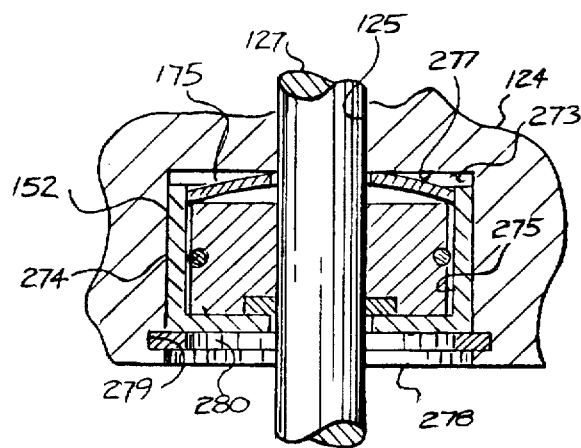
FIG. 27 is a view generally corresponding to the view of FIG. 8 and showing alternate means for coupling a seal assembly the instant device with the valve assembly to be sealed.

Alternate means for installation of a seal device of the instant invention will now be described with reference to FIG. 27. For illustrative purposes there is seen cylinder head 124, bore 125 and shaft 127 as previously described. Further seen is counterbore 273, generally similar to previously described counterbore 133 except having greater length and diameter. Also set forth for purposes of illustration is seal device 274 including carrier member 152 and Belville washer 175. Shown for purposes of orientation and reference, seal device 274 is intended to be representative of a typical seal device embodying the principles of the instant invention.

Counterbore 273 includes cylindrical surface 275, shoulder or radial surface 277 intermediate bore 275 and cylindrical surface 275 and open end 278. Annular groove 289 formed into cylindrical surface 275 near open end 288 is sized to receive a conventional internal snap ring 280. Preferably, counterbore 273 has a diameter such that carrier member 252 is closely but slightably received within cylindrical surface 275. Further, it is preferred that the distance from the inner side of snap ring 279 to shoulder 272 is greater than the height of carrier member 252. Accordingly, seal device 274 is retained within counterbore 273 by snap ring 279 with Belville washer 175 bearing against shoulder 277 to concurrently urge the seal assembly against the end wall of carrier member 252 and the end wall inturn against snap ring 279. It is seen that the seal device is readily withdrawn from the counterbore after removal of the snap ring from the snap ring groove in accordance with conventional technique. If desired, the second seal member may be provided with a recess especially adapted for receiving a removal tool such as previously described in connection with FIGS. 23 and 24. It is also envisioned that the washer 175 may lie intermediate the seal assembly and the end wall of the carrier member.

Figures 28, 29:
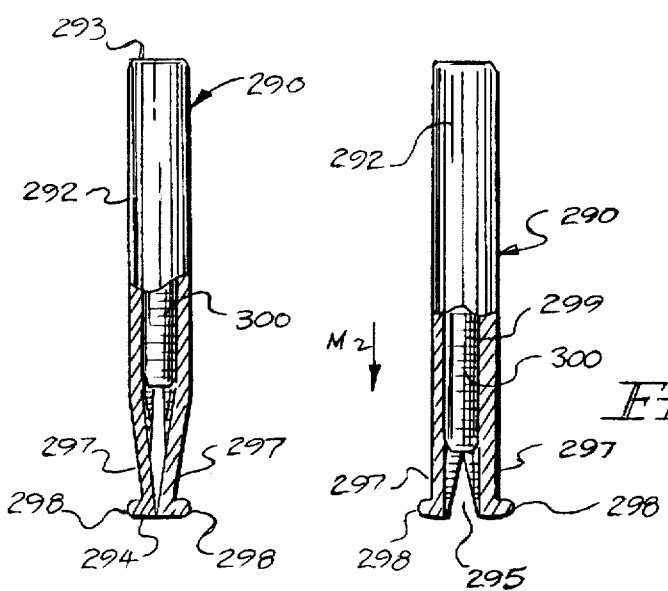
FIG. 28 is an elevational view of an alternate seal removing tool, as it would appear in the relaxed position and having portions thereof broken away for purposes of illustration.
FIG. 29 is a view generally similar to the view of FIG. 28 and showing the tool thereof as it would appear in the extended or use position.

FIGS. 28 and 29 illustrate an alternate removal tool generally designated by the reference character 290. In general similarity to the previously described removal tool 240, the immediate embodiment includes shank 292 having first end 293 and second end 294. Slit 295 bifurcates a portion of shank 292 adjacent second end 294 into legs 297, each of which carries an outwardly directed projection 298. Longitudinally extending bore 299 is threaded for engagement with set screw 300.

FIG. 28 specifically illustrates tool 290 as it would appear in the relaxed position. Set screw 300 resides at a location within bore 299 that is remote from legs 297. Legs 297 are normally directed inwardly, carrying projections 298 in a retracted position for passage through the bore 295. In response to rotation, as by a screwdriver, wrench or other tool extending through bore 299 from end 293, screw 300 moves in the direction indicated by the arrowed line M urging legs 297 outwardly to position the projections 298 within the recess provided as previously described.

Referring now to FIGS. 30 and 31 there is seen a tool, generally designated by the reference character 310 having shank 312, pilot 313 and intermediate cutting portion 314. Cutting portion 314 forms a seal apparatus receiving recess into valve guide 122 coaxial with bore 125 as will be presently explained in detail. During use, tool 310 is rotated as indicated by the arcuate arrowed line N by any conventional means such as stationary drill press, portable drill motor or manually as will be appreciated by those skilled in the art. Pilot 313, an elongate cylindrical member, is sized to be inserted and closely received within bore 125 to function as a guide for alignment of the recess with bore 125.

Analogous to a conventional boring tool, such as a drill or reamer, cutting portion 314 includes a plurality of longitudinally extending alternating lands and flutes designated 315 and 316, respectively. Each of the several lands 315 are contoured to have a first axial cutting surface 318 and a larger coaxial second axial cutting surface 319. First radial cutting surface 320 extends inwardly from the lower edge of first axial cutting surface 318. Second radial cutting surface 322 resides intermediate the axial cutting surfaces 318 and 319. Angled cutting surface 323 extends between radial cutting surface 320 and pilot 313. The lower end of shank 312, having a diameter greater than the diameter defined by the several second axial cutting surfaces 319, terminates with shoulder 324 which extends inwardly to meet second axial cutting surface 319.

Recess 327, formed by cutting portion 314 of tool 310, includes first counterbore 328 terminating with inwardly directed radial surface 329 and second counterbore 330 terminating with inwardly directed radial surface 332. Also formed is frustoconical cavity 333. It will readily appreciated that cavity 333 is formed by angled cutting surface 323, first counterbore 328 is formed by first axial cutting surface 318 and first radial cutting surface 320 and second counterbore 330 is formed by second axial cutting surface 319 and second radial cutting surface 332. Shoulder 324 functions as a stop to limit the depth of cutting portion 314. Further description of recess 327, including the function thereof, will be made presently.

FIG. 32 illustrates a seal apparatus of the instant invention including retainer 338 and seal assembly 339 as further seen in FIG. 33. Seal assembly 339 includes first seal member 340 and second seal member 342. Seal assembly 337 is especially adapted to be received in recess 327 for sealing valve stem 127 to head 124 in a manner generally analogous to the previously described embodiments. A further understanding of the immediate embodiment will be had as the detailed description ensues.

A generally annular structure, retainer 338 includes a pair of spaced apart sides 343 and 344, outer peripheral surface 345 and central opening 347. In accordance with the immediately preferred embodiment of the invention, outer peripheral surface 345 is sized to be frictionally received within second counterbore 330. Opening 347 is a clearance opening for receiving valve stem 127 therethrough.

First seal member 340, another annular member, includes spaced apart sides 348 and 349, outer peripheral surface 350 and bore 352. Counterbore 353 forms an annular recess in side 348 contiguous with bore 352. The member is severed by radially extending end gap 354.

Second seal member 342, yet another annular structure, includes sides 356 and 357, outer peripheral surface 358 and bore 359. Radial end gap 360 severs the member.

Referring more particularly to FIG. 33, it is seen that outer peripheral surface 358 of second member 342 is sized to be closely received within recess 353 of first member 340. Preferably, the thickness of second member 342 coincides with the depth of recess 353 whereby surfaces 348 and 356 are flush. It is also preferred that the bores 352 and 359 are congruent and sized to sealingly receive valve stem 127. For reasons previously described, end gaps 354 and 360 are angularly spaced, preferably diametrically apart. By virtue of end gap 360, second member 342 is compressive. In accordance with the previously described embodiments, second member 340 is radially inwardly biased to exert a compressive or constrictive force upon second seal member 342.

Illustrated in FIG. 34 is an installation tool for inserting seal apparatus 337 into recess 327 in accordance with the teachings of the instant invention. Generally designated by the reference character 362, the installation tool includes first second and third cylindrical sections 363, 364 and 365, respectively, which are coaxially aligned along a common longitudinal axis. First cylindrical section 363 resides adjacent first end 367. Third cylindrical section 365 resides adjacent second end 368. Second section 364 resides intermediate sections 363 and 365. A first annular shoulder 369 extends inwardly from second cylindrical section to first cylindrical section 367. Similarly, a second annular shoulder extends inwardly from third cylindrical section 365 to second cylindrical section 364.

Beginning with first cylindrical section 363, the cylindrical sections have progressively increasing diameters. Sized to be received in bore 125 with a locational clearance fit, first cylindrical section 363 functions as a pilot for guiding insertion of tool 362 into bore 125. From the foregoing description, it is apparent that first cylindrical section 363 has a diameter which is substantially the same as valve stem 127. Accordingly, seal assembly 339 will constrictively engage the cylindrical section 363 to be frictionally retained thereon.

Second cylindrical section 364 is sized to slidably and locationally receive bore 347 of retainer 345. The length of section 364, i.e. the distance between shoulders 369 and 370, is less than the thickness of retainer 345 as measured between surfaces 343 and 344. In preparation for use of tool 362, retainer 338 is held upon second cylindrical section 364 by seal assembly 339.

First counterbore 328 functions as a pocket for receiving seal assembly 339. Second counterbore 330 functions as a receptacle for receiving retainer 338. When first cylindrical section 363 is inserted into bore 125, seal assembly 339 and retainer 338 are placed in registry with the respective pocket and receptacle. In response to movement of tool 362 in a direction indicated by the arrowed line O, seal assembly 339 is placed in first counterbore 328 and retainer 338 is urged into second counterbore 330. As previously noted, the outer peripheral surface 345 of retainer 338 is sized to be frictionally engaged within a receptacle. The insertion operation may require the application of greater than manual force such as tapping end 368 with a hammer.

During the insertion operation, surface 344 of retainer 338 is firmly seated against radial surface 332 as especially seen in FIG. 35. Counterbore 327 has a diameter which is greater than the diameter measured across the outer peripheral surface 35 or of first seal member 340. The depth of second counterbore 328, i.e. the distance between radial surface 329 and the side 344 of retainer 338 when seated against radial surface 332 is greater than the thickness of seal assembly 339, generally the distances between sides 348 and 349 of first seal member 348. Accordingly, seal assembly 339 is laterally movable within the pocket as represented by the double arrowed line designated P. The depth or axial measurement of first counterbore 328 sufficiently approximates the thickness of seal assembly 339 such that the seal assembly is preferably in sliding contact with radial surface 329 and with side 344. Accordingly, flutter or reciprocal movement in axial directions as indicated by the double arrowed line Q is retarded.

Frustoconical cavity 333 functions as a reservoir for holding a supply of lubricant for shaft 127 and bore 125. Cavity 333 also functions to receive the projections 248 or 298 associated with the previously described removal of tools 340 and 390, respectively. In all other respects, the immediate embodiment is analogous to the previously described embodiments. In this regard, it is noted that the function of retainer 338 is generally analogous to the function of the previously described carrier members. However, the close receipt of the seal assembly between surface 329 and side 344 eliminates the necessity for the previously described Belville washer. Nevertheless, it is within the scope of the instant invention that second counterbore 328 could be of sufficient depth to include the Belville washer for purposes previously described.

Turning now to FIG. 36 there is seen an alternate installation tool generally designated by the reference character 372 which, in general similarity to the previously described installation tool 362, includes first cylindrical section 363, second cylindrical section 364 and third cylindrical section 365. Further included is first end 367, second end 368, shoulder 369 and shoulder 370. In contrast to the previously described embodiment, third cylindrical section 365 in the immediate embodiment includes reduced diameter section 373 which forms a shaft upon which is carried cylindrical member 374. The member 374 is manually movable in the reciprocal directions as indicated by the double arrowed line R. As will be appreciated by those skilled in the art, cylindrical member 374 is manually moveable to function in a manner analogous to a slide hammer for forcibly urging and seating retainer 338 within the receptacle formed by counterbore 330. In other aspects not specifically described, reference is made to the detailed description previously set forth in connection with the installation tool designated 362. It is noted, that to enhance grip, cylindrical section 365 and cylindrical member 374 have a knurled exterior surface.

Illustrated in FIG. 37 are alternate end gaps 378 and 379 for severing previously described first member 340 and second member 342, respectively. As viewed in plan, each end gap is oblique or angularly disposed to a radial line. A further understanding of the immediate end gap configuration can be had with reference to the detailed description of the embodiment of FIG. 25. Attention is also directed to the detailed description associated with the device of FIGS. 2–4.

FIG. 38 illustrates yet another end gap configuration for severing the members 340 and 342. End gap 380 severing second member 342 includes first radial portion 382 extending inwardly from outer peripheral surface 358 and second radial portion 383 extending outwardly bore 359. The radial portions, which are angularly offset, are joined by intermediate portion 384 which is oblique or angularly disposed to a radial line. Similarly, the member 340 is severed by end gap 386 having first radial section 387 extending inwardly from outer peripheral surface 350 and angularly offset second radial portion 388 extending outwardly from opening 352. Intermediate portion 389, oblique or angularly disposed to radial line, joins the portions 387 and 388.

Intermediate portions 384 and 389 of the respective end gaps 380 and 386 are angularly disposed in opposite directions from a common radial line. In accordance with the previously described seal devices, it is preferred that the end gaps of the respective members are approximately diametrically opposed during assembly. First member 340 exerts a continuous radially inward constrictive force upon second member 342. The force acts to prohibit relative rotational movement between the angular members of the assembly. In the desired orientation, each angular member serves to seal or close the end gap of the other member thereby eliminating a fluid leakage path.

Should relative rotation occur between the members 340 and 342, the respective end gaps 386 and 380 could align as illustrated in FIG. 39. As appearing in the plan view, intermediate portions 384 and 389 intersect leaving only a minimal opening 390 extending through the assembly. For a more detailed discussion of intersecting end gaps, attention is directed to the previous description associated with FIGS. 2–4. It is noted, however, that when the seal assembly is used in connection with a viscous fluid such as oil flow through the opening 390 is substantially less than the flow of a gaseous medium.

In addition to the foregoing described advantages, the immediate gap configuration also provides the advantage of the elimination of any sharp peripheral edges. In other words, the apex formed between peripheral surface 350 and radial portion 387 is at a substantially greater angle than the steep acute angle which would be formed between peripheral surface 350 and intermediate section 389. The teachings associated with the immediate embodiment are also applicable to the embodiment illustrated in FIGS. 2–4. It is also noted that leakage through the exposed portion of end gap 386 and member 340 external member 342 is eliminated as a result of closely residing intermediate radial surface 329 of counterbore 328 and side 344 of retainer 338.

FIGS. 40 and 41 illustrate alternate means which can be practiced in accordance with any of the embodiments of the instant invention for sealing the respective end gap. For purposes of illustration there is seen a fragmental portion of an annular seal member generally designated by the reference character 392. Analogous to the previously described annular members, member 392 includes a pair of spaced apart sides 393 and 394, outer peripheral surface 395 and inner peripheral surface 397. In the area normally forming the end gap, member 392 includes a first arcuate segment 398 of reduced thickness and contiguous with surface 393. A similar second arcuate segment 399 of reduced thickness extends contiguous with the side 394. Shoulder 400 resides intermediate segment 398 and side 394. Shoulder 402 resides intermediate segment 399 and side 393. In accordance with the immediately preferred embodiment of the invention, each segment and respective shoulder is a mirror image of the other.

Segments 398 and 399 overlap for a portion of the respective lengths. Accordingly, there are formed two end gaps, each extending inwardly from the respective side for a portion of the thickness of member 392. It will be immediately appreciated by those skilled in the art that annular member 392 may be appreciably compressed or expanded with the segments 398 and 399 maintaining the overlapping configuration. Accordingly, the member is usable for sealing against an external surface as particularly seen in FIG. 35 or against an internal surface as illustrated in FIG. 4. The teachings are also applicable to either or both of the members of a seal assembly.

Figure 42:
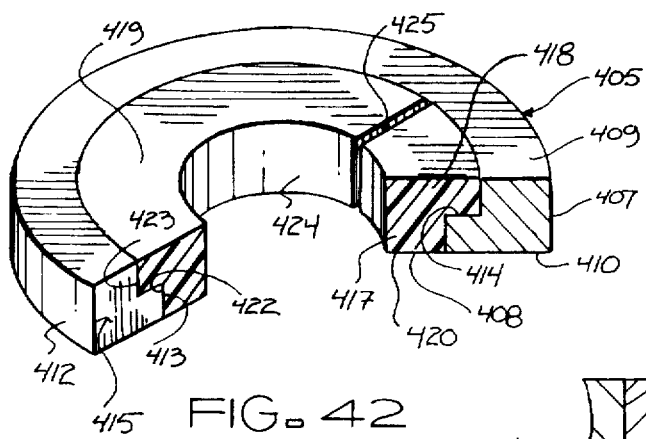
FIG. 42 is a fragmentary perspective view of yet another seal assembly of the instant invention.

An alternate seal assembly, generally designated by the reference character 405 and including first member 407 and second member 408, adapted to be received within the recess 327 is illustrated in FIG. 42. Analogous to the previously described first members, first member 407 includes a pair of opposed sides 409 and 410, outer peripheral surface 412 centrally located opening 413 and recess 414 contiguous with opening 413. In accordance with the immediately preferred embodiment of the invention, opening 413 is a bore concentric with outer peripheral surface 407 and recess 414 is a counterbore coaxial with opening 413. Opening 413 is larger, for reasons which will be appreciated presently, than the corresponding element of previously described first members. End gap 415 severs the member.

Second member 408 includes central portion 417 and outwardly projecting portion or flange 418. Side 419, preferably a planar surface, is continuous with central portion 417 and flange 418. Side 420 is carried by central portion 417. The outer surface of second member 418 is sized to be received in contact with the surfaces formed by opening 413 and recess 414 and first member 407. As seen in the illustration, outer peripheral surface 422 of central portion 417 abuts opening 413 while outer peripheral surface 423 of flange 419 resides in juxtaposition with the cylindrical sidewall of recess 414. It is further noted that sides 419 and 420 of second member preferably lie in a common plane with the sides 419 and 410, respectively, of first member 407. Coaxial bore 424 extending through second member 408 sealingly engages stem 127.

By virtue of end gap 425, second member 408 is compressive. Second member 407 is radially inwardly biased to exert a constrictive force upon second member 408. Accordingly, bore 424 is maintained in sealing engagement with stem 127 as the corresponding surfaces wear. Second member 408 may also be radially inwardly biased, however, it is preferred that first member 407 exert a greater compressive force.

First member 407 and second member 408 are readily fabricated of various materials. In accordance with a preferred embodiment thereof, first member 407 is fabricated of a metal such as mild steel or brass. Second member 408 may be similarly fabricated of a metal or, alternately, a selected synthetic material such as various plastic resins. It is noted that certain materials are sufficiently elastic or deformable to be inherently compressive. Exemplary are materials containing nylon or tetraflouroethylene. Such materials may be used for the fabrication of a second member 408 without and end gap.

Figure 43:
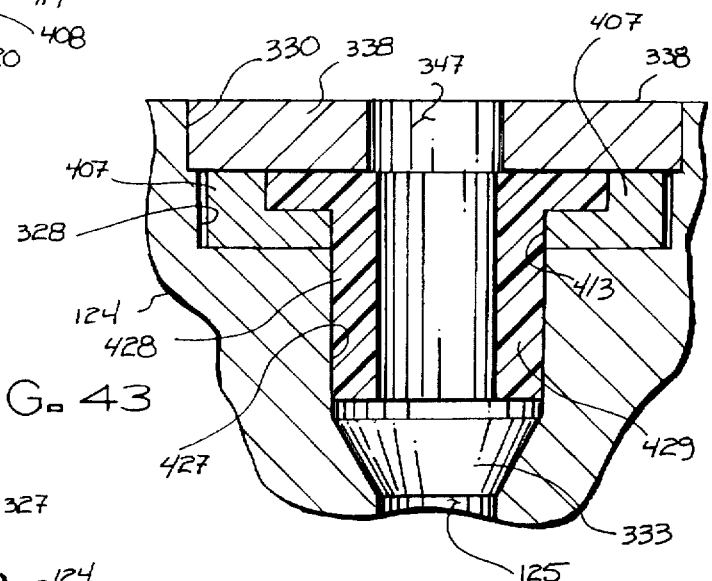
FIG. 43 is a vertical sectional view of yet another seal apparatus of the instant invention as it would appear when installed in a recess formed in a body.
Figure 44:
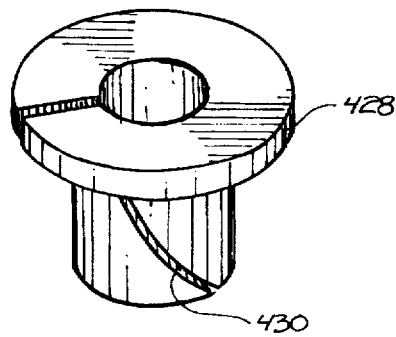
FIG. 44 is a perspective view of the seal member seen in FIG. 43.

FIG. 43 illustrates an alternate means for sealing a shaft to a body. Recess 327 including first counterbore 328, second counterbore 330 and frustoconical cavity 333 are formed into the body as previously described. A modification thereof, however, a third counterbore 427 resides intermediate first counterbore 328 and frustoconical cavity 333. Carried in the recess 327 are previously described retainer 338 and first member 407. Second seal member 428, a modification of previously described second member 408, includes a central portion 429 which is extended to project through first member 407 and reside within third counterbore 427. In all other aspects second member 429 is analogous to previously described second member 408 and may be fabricated accordingly. By virtue of the extended length, central section 429 provides the additional function of a guide for stem 127. While second member 428 may include an end gap in accordance with any of the previously discussed configurations, it is preferred that the member be severed by a helically extending end 430 as seen in FIG. 44.

Figure 45:
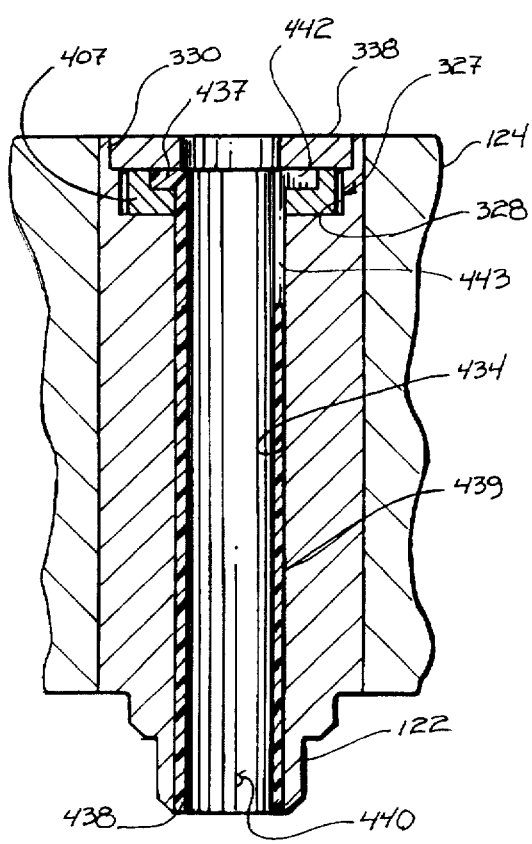
FIG. 45 is a view generally corresponding to the view of FIG. 43 and showing yet another alternate embodiment thereof.

Reference is now made to FIG. 45 wherein there is seen an alternate embodiment of the invention which, in common with previously described embodiments, includes recess 327 for receiving first seal member 409 and retainer 338. Coincident with forming recess 327, the diameter of bore 125 is enlarged to create, in effect, a third counterbore 434. Further provided by the immediate embodiment is an alternate seal assembly generally designated by the reference character 435 and further including alternate second member 437. Second member 437 includes a central portion 438, generally in the form of an elongate tubular member, having an outer surface 439 and a bore 440. Outer surface 434 is sized to be locationally received, as by press fitting into counterbore 434. Bore 440 is sized to guidingly receive stem 127 in accordance with standard tolerances as will be appreciated by those skilled in the art. Flange 442 projects outwardly from central portion 438 to reside within the recess 414 in first member 407. Optionally, flange 442 and a portion of central portion 438 adjacent thereto is severed by end gap 443.

The immediate embodiment is especially devised for restoring dimensional tolerances which have been destroyed as the result of wear of either the original bore 125 or the stem 127. The immediate embodiment also provides an alternately selectable material as a guide for stem 127. For example, valve guides are conventionally fabricated of metal which requires lubricant. Various materials having inherent lubricating properties, such as nylon and Teflon®, will readily occur to those skilled in the art.

Figure 46:
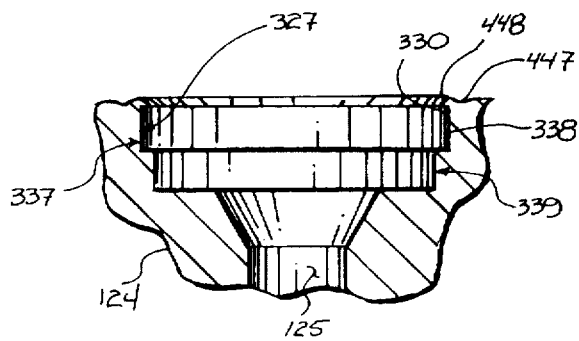
FIG. 46 is a view generally corresponding to the view of FIG. 43 specifically illustrating alternate means for retaining a seal apparatus within a recess.

FIG. 46 illustrates an alternate means utilizing mechanical fastening to retain seal apparatus 337 within recess 327. In accordance with the immediately preferred embodiment, receptacle 330 is formed to a depth slightly greater than the thickness of retainer 338. Thereafter, the external edge of receptacle 338 is deformed, as by peening or staking, to overlap surface 343 of retainer 338 as evidenced by indentation 447 and lip of material 448. Preferably, indentation 447 and lip 448 are annular to extend continuously about retainer 338. Tools for the immediate purpose, such as the well known valve staking tool, are readily commercially available for the purpose.

Figure 47:
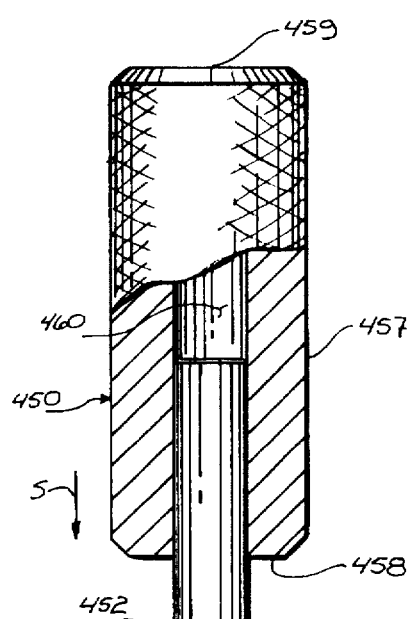
FIG. 47 is a view generally corresponding to the view of FIG. 34 and showing an alternate installation tool.

Turning now to FIG. 47 there is seen an alternate installation tool, generally designated by the reference character 450 including an elongate shaft 452 having first cylindrical section 453 and second cylindrical section 454 having angular shoulder 455 therebetween. In general analogy to previously described first cylindrical section 363 of tool 362, first cylindrical section 453 functions as a pilot for enguiding insertion into bore 125. Second cylindrical section 454, analogous to previously described second cylindrical section 364, locationally holds retainer 338.

Tool 450 is illustrated at an intermediate stage of use. During the next stage, shaft 452 is moved in the direction of arrowed line S wherein seal assembly 339 is received within pocket 330 and shoulder 455 rests upon seal assembly 339.

Tool 450 further includes combination handle and striker 457 having first and second ends 458 and 459, respectively, and bore 460 which is slidably disposed upon shaft 452. Subsequent to the above described stage of operation, striker 457 is moved in the direction of arrowed line S to bring first end 458 into contact with a side of retainer 338. Finally, striker 457 is forcibly moved, as by tapping with a hammer, in the direction of arrowed line S to seat retainer 338 in receptacle 330.

Figure 48:
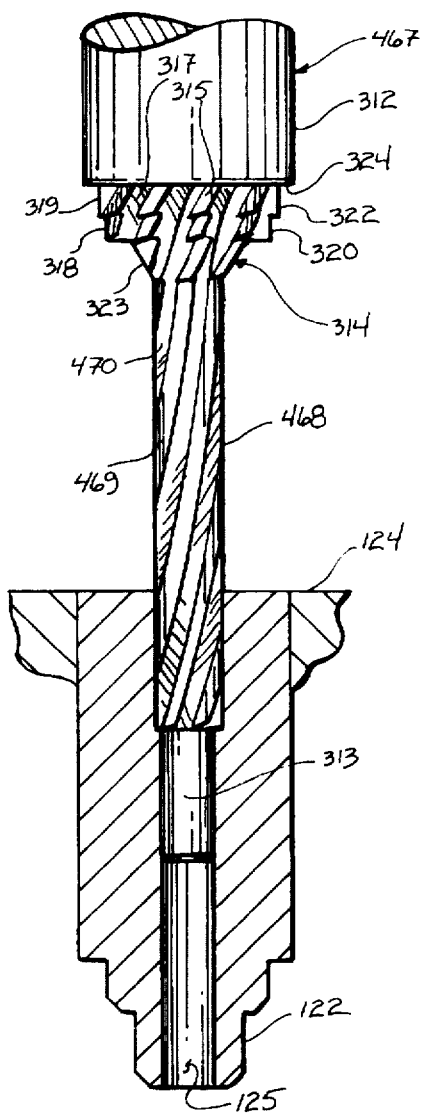
FIG. 48 is a view generally corresponding to the view of FIG. 31 and illustrating an alternate forming tool embodying the principles of the instant invention.

An alternate recess forming tool generally designated by the reference character 467 is seen with regard to FIG. 48. The immediate embodiment includes various elements in common with the previously described recess forming tool designated by the reference character 310. Especially noted is shank 312, pilot 313 and cutting portion 314.

In accordance with the immediate embodiment, bore cutting portion 468 having the conventional lands and grooves 469 and 470, respectively, resides intermediate pilot 313 and recess cutting portion 314. Tool 467 is used a manner analogous to previously described tool 310 for forming seal apparatus receiving recess 327. Concurrently therewith, however, bore 125 is enlarged and resized. Specifically, tool 467 may be used to form the bore 434 as previously described in connection with FIG. 45. Bore cutting portion 468 may also be used to size the original bore 125 in valve guide 122. As will be appreciated by those skilled in the art, valve guides are commercially supplied with an undersized bore 125 which must be sized subsequent to installation in a cylinder head. It will also be appreciated that bore cutting portion 468 may be of shorter length for forming the counterbore 427 illustrated in FIG. 43.

Figure 49:
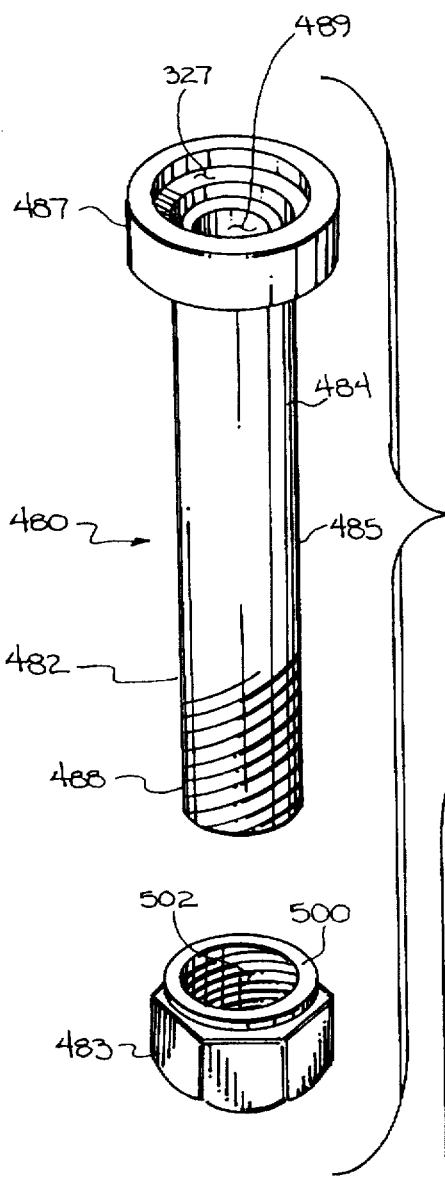
FIG. 49 is a perspective view of a replaceable valve guide assembly, constructed in accordance with the teachings of the instant invention, and especially adapted for holding a seal apparatus of the instant invention.
Figure 50:
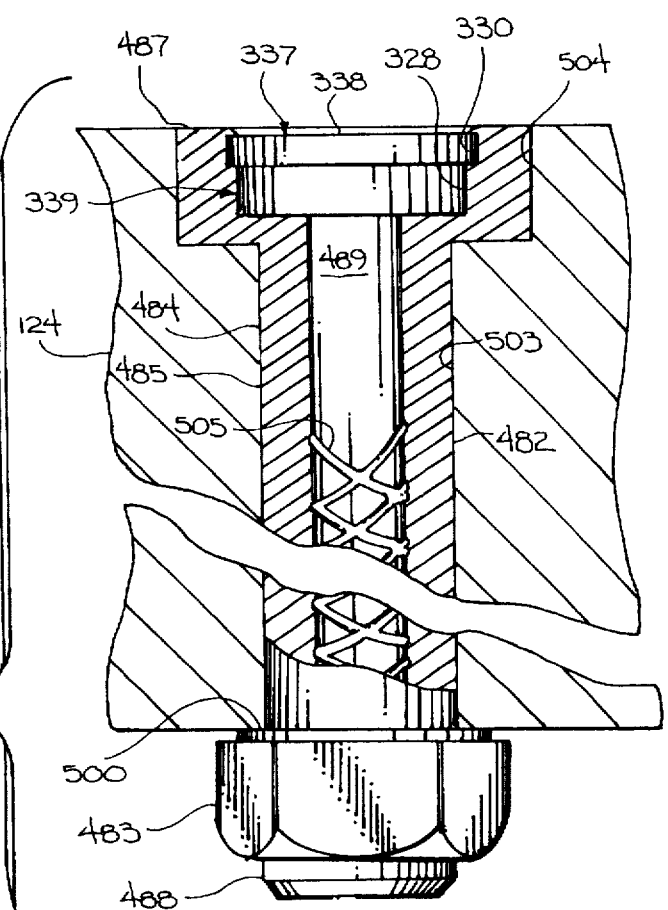
FIG. 50 is an illustration showing the replaceable valve guide assembly of FIG. 49 as it would appear when installed in a cylinder head, the view being fragmentary and taken along the longitudinal axis of the guide.

Reference is now made to FIG. 49 wherein there is seen a replaceable valve guide assembly generally designated by the reference character 480 including guide member 482 and fastening member 483. Guide member 482 further includes elongate trunk 484, preferably a cylindrical having outer cylindrical surface 485. Head 487, generally an enlarged flange having previously described recess 327 formed therein, is carried at one end of trunk 484. An externally threaded terminal portion 488 resides adjacent the other end of trunk 484. Bore 489, analogous to previously described bore 125, extends axially through flange 487 and trunk 480. Fastening member 483, generally in the form of a conventional nut, includes contact surface 500 and internally threaded bore 502.

As will be appreciated by those skilled in the art, valve guides such as typified by the previously described valve guide designated by the reference character 122, are press fitted into the cylinder head with considerable force requiring a press or other specialized equipment. The immediate embodiment of the invention provides an alternative which are easily installed and replaced. It is further contemplated by the immediate embodiment invention that the valve guide assembly can be supplied as a premanufactured unit including any of the previously described valve seal means. Chosen for purposes of illustration as the seal apparatus previously described in connection with FIG. 32 and generally designated by the reference character 337.

In preparation for insertion of valve guide assembly 480, the conventional valve guide 122 is removed leaving cylindrical opening 503 extending through head 124. Counterbore 504 is formed into one of the surfaces of the head 124. Trunk 484 is sized to be locationally received within bore 503. Counterbore 504 similarly sized to receive flange 487. Preferably, the tolerance between surface 485 and opening 583 and between flange 487 and counterbore 504 provide the locational interference fit which requires minimal force for insertion. After insertion of the guide member 482 through head 124, fastening member 483 is secured to threaded portion 488 to retain the assembly in place.

Seal apparatus 337, or an alternately chosen embodiment thereof, may be retained within flange 487 by any conventional means such as press fitting or peening as previously described. The seal apparatus may also be retained by an internal snap ring for ease of replacement. It is also within the scope of the immediate embodiment that means be provided for lubricating at least a portion of the contact area between the bore 489 and valve stem 127. For purposes of illustration there is seen oiling means in the form of a double helical groove 505 formed into bore 489 and extending a portion of the length thereof from the end to which is secured fastening member 483.

Turning now to FIG. 51 there is seen yet another guide assembly, generally designated by the reference character 510 including a first member or body portion 512 and a cap portion or second member 513. Body portion 512 includes elongate trunk 514, preferably a cylinder having outer cylindrical surface 515, which is preferably sized to be press fitted into the normal valve stem guide bore in cylinder head 124 as previously described. Annular flange 517, projecting radially outward from the upper end of trunk 514, is receivable against cylinder head 124, preferably the surface adjacent the oil laden area 130. Tubular projection 518 having recess 519 therein extends, in axial alignment with trunk 514, upwardly from annular flange 517.

Cap portion 513 includes recess 520 which receives tubular projection 518 of body portion 512. For purposes of assembly, it is preferred that tubular projection 518 be received in press fitting engagement within recess 520. Alternate means for assembly of the cap portion with the body portion are within the scope of the invention. Exemplary is a threaded engagement including an external thread carried by the tubular projection of the body portion and a mating internal thread carried within the recess of the cap portion. Bore 522 extends continuously through body portion 512 and cap portion 513. The recesses 519 and 520 are preferably counterbores formed into body portion 512 and cap portion 513, respectively.

A selected one of the previously described seal devices resides within recess 519. Chosen for purposes of illustration is the seal device 132 illustrated in FIGS. 9 and 10 and including first seal member 134 and second seal member 144. Recess 519 has a finite height as determined by the distance between radial surface 523 of recess 519 and radial surface 524 of recess 520. Preferably, this dimension is approximately five ten-thousandths greater than the height of seal device 132. Similarly, it is preferred that the diameter of recess 519 be approximately ten one-thousandths greater than the diameter of seal device 132. Accordingly, seal device 132 is relatively moveable in lateral or radial directions and substantially retarded from movement in longitudinal or axial directions.

FIG. 52 shows an alternate embodiment of the invention generally designated by the reference character 530 and including body portion 532 and cap portion 533. In general similarity to the embodiment of FIG. 51, body portion 532 includes trunk 514 having outer cylindrical surface 515 and annular flange 517. Further, bore 522 extends continuously through body portion 532 and cap portion 533.

In contrast to the previously described embodiment, tubular projection 534 is of greater axial length than previously described tubular projection 518, thereby positioning recess 519 at a location near the upper end of cap portion 532. This has the effect of providing a substantially greater portion of bore 522 below the seal device 132.

Each of the embodiments of the invention seen in FIGS. 51 and 52 are specially devised for sealing a shaft extending through a body where a pressure differential exists between the sides of the body. Exemplary, as previously described in detail, is the sealing of a valve stem within the head of an internal combustion engine. Guide assembly 510 is especially devised for use in combination with an exhaust valve wherein a high pressure area resides at the lower end of body portion 512. The embodiment designated 530 has particular application in connection with an intake valve wherein a low pressure area exists adjacent the lower end of body portion 512.

Guide assemblies 510 and 530 are installed by press fitting trunk portion 514 of the respective body portions 512 and 532 into the opening or bore formed in the cylinder head for normally receiving the valve guide in accordance with conventional practice. During this initial phase, the assembly is disassembled. That is, the cap portion and the seal device are separated from the body portion. After installation of the body portion, bore 522 is sized and finished in accordance with conventional procedure, such as by reaming or honing, to the size required for receiving the valve stem. Subsequently, the selected seal device is placed within the recess and the cap portion is assembled with the body portion.

It is well-known by those skilled in the art that the diameter of a valve stem is subject to manufacturing tolerance. The tolerance generally allows for a variance of approximately two one-thousandths of an inch. The internal diameter, shaft engaging surface, of a seal device is also subject to manufacturing tolerance. Therefore, to substantially eliminate wearing-in and provide an immediate satisfactory sealing engagement between the seal device and the shaft or valve stem, there is provided an alternate method of installation.

In accordance with the immediate method, a stabilizer is employed for immobilizing the seal within the cavity. An exemplary stabilizer is the adhesive distributed by 3M Manufacturing Company under the tradename CA50 GEL™. A wax for this purpose is also available from the same company. Such stabilizers are subject to melting or softening in the presence of heat in the range of above one hundred fifty degrees and are subsequently dissolved and flushed by various liquids. It is noted that the cylinder head of an internal combustion normally operates in the range of two hundred seventy five degrees and that normal engine lubricating oil functions as a satisfactory solvent.

Before the stabilizer sets, the body portion, the cap portion and the seal device are assembled. Preferably, a mandrel is passed through the bore for purposes of axially aligning the seal device. The mandrel may also expand the seal device for purposes of pre-tensioning. The assembly is then installed into the holding body or cylinder head. Subsequently, the bore is finished in accordance with procedures considered to be standard in the art. It is noted that during the finishing procedure, the internal diameter or shaft engaging surface of the seal device is also sized and finished to mate with the selected valve stem. During initial operation of the engine, the stabilizer is dissolved as described above and the seal device freed to sealingly engage the valve stem.

Figures 53, 54:
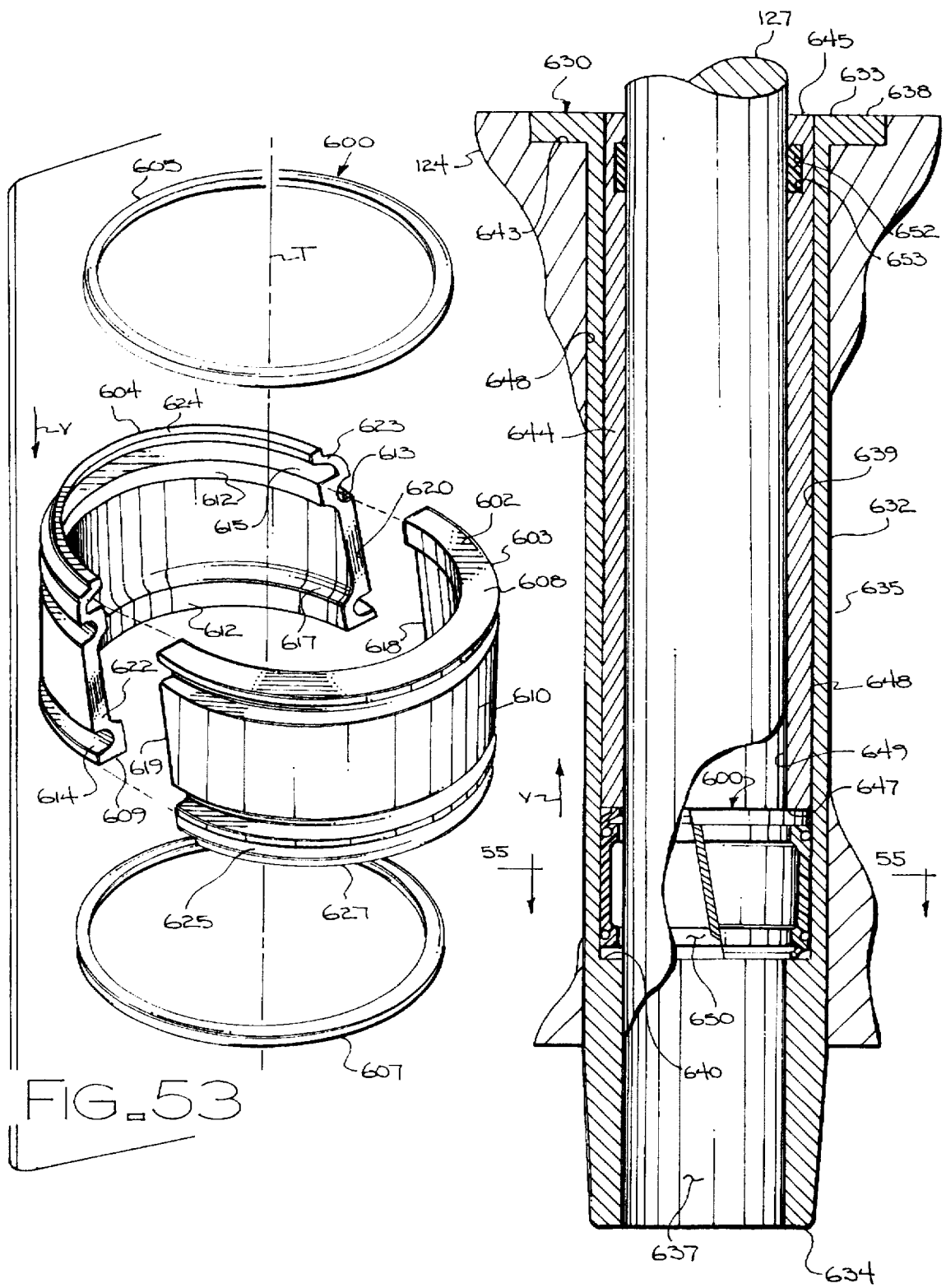
FIG. 53 is an exploded perspective view of a seal apparatus embodying the principles of the present invention.
FIG. 54 is a fragmentary vertical sectional view of a main body having an opening therethrough in which is moveably disposed a shaft and showing the seal assembly of FIG. 53 as it would appear when used to seal the shaft within the opening.

Referring now to FIG. 53 there is seen an alternate seal assembly, generally designated by the reference character 600, having seal body 602 which, in accordance with the immediately preferred embodiment thereof, is illustrated as a generally hollow tubular member which is divided into first and second segments 603 and 604, respectively. Elastic bands 605 and 607, of which further description will be made presently, encircle segment 605 to maintain the integrity of body 602.

Body 602, which may be fabricated of a high temperature polymer such as Celazole™ or metal such as bronze, includes first and second spaced apart ends 608 and 609, respectively, outer surface 610 and inner surface 612. Grooves 613 and 614 formed in outer surface 610 receive elastic bands 605 and 607, respectively. In accordance with the immediately preferred embodiment of the invention, inner surface 612, a sealing surface as will be further described presently, is in the form of a pair of spaced apart relatively narrow subsurfaces carried by the inwardly directed annular flanges 615 and 617.

To provide the segments 603 and 604, body 602 is divided by a cutting plane which passes through the ends 608 and 609 and is angularly displaced relative the longitudinal axis represented by the broken line T. Accordingly, the segments 603 and 604 are mirror images having skewed terminal surfaces which when viewed in one direction are radial to the axis T and when viewed in the other direction are angularly displaced from the axis T. Illustrated are the skewed surfaces 618 and 619 terminating segment 603 and skewed surfaces 620 and 622 carried by segment 604. Elastic bands 605 and 607, preferably fabricated of material such as Viton™, radially constricts body 603 to normally hold surface 618 against surface 620 and surface 619 against surface 622 in abutting sliding contact.

As a result of the skewed terminating surfaces, segment 603 and 604 has a smaller end and a larger end which are oppositely disposed. For example, first end 608 is the larger end of segment 603 while being the smaller end of segment 604. Located at each smaller end is a spring for biasing the segments in mutually convergent directions along the axis T. More explicitly, the section 603 is urged in the direction indicated by the arrowed line U while the section 604 is urged in the direction indicated by the arrowed line V. The radially and axially biasing of the segments will be fully appreciated as the description ensues.

In accordance with the immediately preferred embodiment of the invention, each spring is generally of the type commonly referred to as a leaf spring which is semi-cylindrical and integrally formed with the respective end of the segment. Seen is spring 623 projecting from the end 608 of segment 604 and terminating with free end 624. Similarly, spring 627 terminating with free end 625 projects from end 609 of segment 603.

Seal 600 is useful for sealing a shaft which is moveably carried within an opening extending through a body. For purposes of illustration, with reference to FIG. 54, there is seen previously described cylinder head 124 and valve stem 127.

Contemplated by the instant invention is a guide assembly, generally designated by reference character 630, for moveably supporting stem 120 and for carrying seal assembly 600. In accordance with the immediately preferred embodiment thereof, guide assembly 630 includes guide body 632, an elongate tubular member, having first end 633, second end 634, outer surface 635 and bore 637. Outwardly directed radial flange 638 is carried at first end 633. Counterbore 639 extending inwardly from end 633 terminates with annular shoulder 640 extending radially inward to bore 637. Bore 642 and counterbore 643 matingly receives guide body 632.

Cylindrical guide liner 644 having first end 645 second end 647, outer surface 648 and inner surface 649 is received, preferably in press fit, within counterbore 639 of guide body 632. Second end 647 of guide liner 644 is spaced from radial shoulder 640 to form a recess 650 for captively retaining seal assembly 600. Annular seal 652, preferably fabricated of a high temperature polymer is carried in mating groove 653 formed into bore 649 proximate first end 645.

Figure 55:
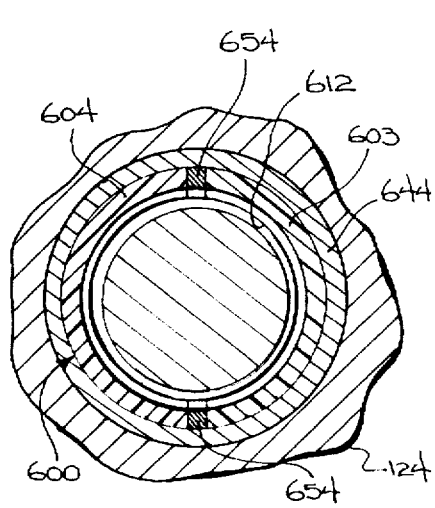
FIG. 55 is a horizontal sectional view taken along line 55—55 of FIG. 54.

The method of installing and putting into service the embodiment described in connection with FIGS. 53 and 54 is generally analogous to the method previously described in connection with FIGS. 51 and 52. Initially, there is selected a seal assembly 600 having an inner surface 612 which is sized to sealingly engage the particular chosen shaft 127. The segments 603 and 604 are then separated, seen with further reference to FIG. 55, and a bead of wax 654 deposited between the surfaces 618 and 620 and between the surfaces 619 and 622 to maintain the separation. The seal assembly is then positioned within bore 639 of guide body 632 against shoulder 640. Liner 645 is then installed within guide body 632 to form seal retaining recess 650. Subsequently, bore 649 of liner 644 and bore 637 of guide body 632 are simultaneously finished in accordance with procedures considered to be standard in the art to a desired dimension for proper receipt of shaft 127. Finally, seal 652 is placed into 653 and shaft 127 is passed through the assembly. In response to application of heat, the wax is melted freeing seal assembly 600 to sealingly engage shaft 127. Alternately, seal assembly 600 could be positioned within recess 650 and subsequently expanded and stabilized with a wax.

Figure 56:
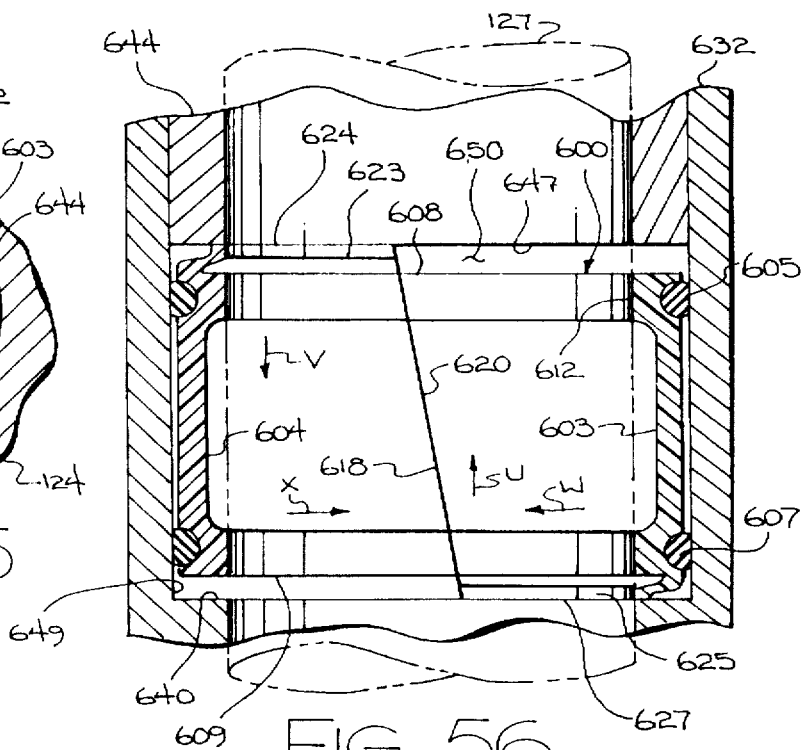
FIG. 56 is an enlarged fragmentary view, generally corresponding to the view of FIG. 54, and showing the seal assembly thereof in greater detail as it would appear when newly installed.

FIG. 56 illustrates seal assembly 600 as it would appear when initially installed and subsequent to the dissolving of the stabilizer. Elastic bands 605 and 607 are compressed against counterbore 649 of guide body 632 and exert mutual inward force upon the segments 603 and 604 as represented by the arrowed lines W and X, respectively. Surface 627 bears against shoulder 640 to compress spring 625 for urging segment 603 in the direction of arrowed line U. Similarly, surface 624 bears against end 647 of liner 644 to compress spring 623 urging segment 604 in direction of arrowed line V. Accordingly, the surfaces 618 and 620 and the surfaces 619 and 622 are held in abutting sliding contact with surface 612 simultaneously in sealing engagement with shaft 127. It is noted that end 608 of segment 603 is spaced from end 647 and end 609 of segment 604 is spaced from shoulder 640.

Figure 57:
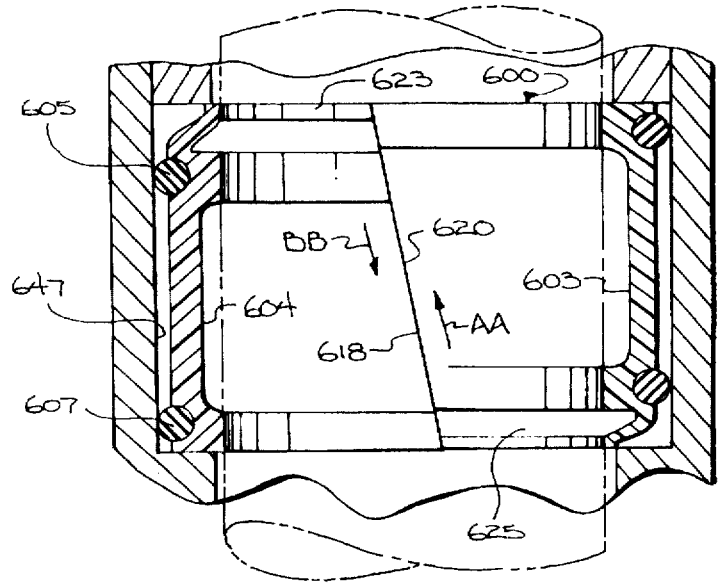
FIG. 57 is a view generally corresponding to the illustration of FIG. 56 and showing the seal assembly as it would appear after compensating for wear of the shaft.

To compensate for wear of shaft 127, segments 603 and 604 move, as seen in FIG. 57, in response to the biasing of elastic members 605 and 607 and springs 623 and 625. The surfaces 618 and 620 and the surfaces 619 and 622 are maintained in abutting sliding engagement with segment 603 moving in the direction indicated by the arrowed line AA and segment 604 moving in the direction indicated by the arrowed line BB. Movement in the direction of the arrowed line AA is the result of the forces urging movement in the directions previously indicated by the arrowed line U and W. Movement in the direction of the arrowed line BB is the result of the forces urging movement in the direction of previously noted arrowed lines V and X. During such movement, elastic bands 605 and 607 expand in cross section, maintaining sealing engagement with counterbore 649. It is noted, that for purposes of illustration in FIGS. 56 and 57, the compression of the springs, the compression of the bands, and the relative movements of the segments has been exaggerated.

Figure 58:
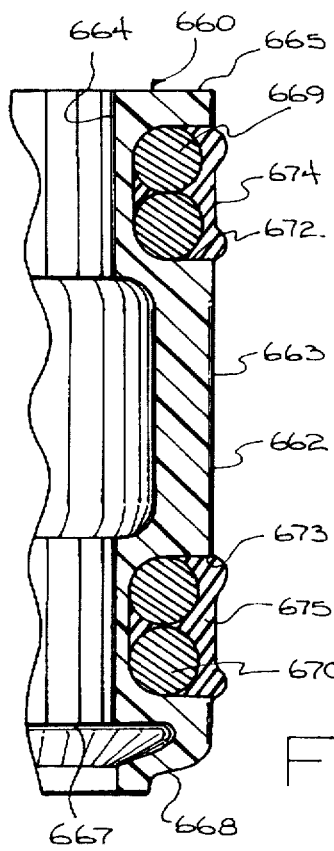
FIG. 58 is an enlarged fragmentary vertical sectional view generally corresponding to a portion of the illustration of FIG. 57 and illustrating an alternate embodiment of the seal assembly thereof.

FIG. 58 illustrates an alternate seal assembly generally designated by the reference character 660 which, in general similarity to the previously described embodiment designated by reference character 600, includes seal body 662 having outer surface 663, inner sealing surface 664, first end 665 and second end 667 from which extends spring 668. Though not specifically illustrated, seal assembly 660 includes first and second segments and is analogous in all other aspects not specifically herein described nor illustrated.

In contrast to the previously described embodiment, the immediate embodiment includes alternate means for biasing the segments in radially constrictive directions represented by the arrowed lines W and X and for maintaining sealing engagement with counterbore 649. Illustrated are spring tempered steel wires 669 and 670 residing within respective grooves 672 and 673 formed into the outer surface 663 of seal body 662. Each wire 669 and 670 may be two coils of a helical member or, alternately, two severed toroidal bands. Even further, it is contemplated that the spring tempered wires 669 670 could be in a form resembling a leaf spring. Elastic bands 674 and 675, for sealing engagement between seal body 662 and counterbore 649 encircle the spring member 669 and 670.

An alternate seal assembly, generally designated by the reference character 680, will now be described with reference to FIG. 59. In general similarity to the previously described embodiments, the immediate embodiment includes seal body 682 having first end 683, second end 684, outer surface 685 and inner sealing surface 687 supported by inwardly directed annularly flanges 688 and 689. Body 680 is divided into first and second segments 690 and 692, respectively, by a cutting plane extending through the ends 683 and 684 and angularly disposed to the longitudinal axis represented by the broken line CC. As a result of the division, first segment 690 terminates with first and second skewed surfaces 693 and 694, respectively. Similarly, second segment 692 terminates with first and second skewed surfaces 695 and 697, respectively. Surface 693 is received in mating sliding abutment with surface 695. Surfaces 694 and 697 are similarly related. Preferably, the segments 690 and 692 are mirror images. With the respective skewed surfaces in abutment, the segments form the generally cylindrical seal body 682 having annular groove 698 formed into the outer surface 685 thereof.

In further general similarity to the previously described embodiments, biasing means are associated with each of the segments for urging mutual convergence along the longitudinal axis. More specifically, in accordance with the immediately preferred embodiment, spring 699 is carried by first segment 690 and spring 700 is carried by second segment 692. Pin 702 projecting from spring 699 is received within mating opening 703 formed into first segment 690 from first end 685. Similarly, pin 704 projecting from spring 700 is received in mating opening 705 formed into second segment 692 from the first end 683 thereof.

As viewed in plan, each spring is generally C shaped or semi-circular to be substantially congruent with the respective end of the respective segment. As viewed in elevation, spring 699 includes an intermediate section 707 which resides against surface 682 and raised terminal portions 708 and 709 which are spaced from surface 682. Similarly, spring 700 includes intermediate section 710 which resides against surface 683 terminal portions 712 and 713 which are spaced from surface 683. Further included in the immediate embodiment is elastic band 714 having annular body portion 715 which resides in groove 698 and supports outwardly extending annular projection 717.

The installation and function of seal assembly 680 is generally analogous to the installation and function of the previously described embodiment designated by the reference character 600. In this regard, the illustration of seal assembly 680 as seen in FIG. 60 is analogous to the illustration of seal assembly 600 as seen in FIG. 57 after compensating for wear. When seal assembly 680 is initially installed within recess 650, annular projection 717 is compressed to form a lip seal with surface 649 and valve guide body 632 as seen in FIG. 61. As the segments 690 and 692 move in the respective directions indicated by the arrowed lines AA and BB, projection 717 tends to extend to maintain contact with surface 649 as seen in FIG. 60.

Attention is now directed to FIGS. 62 and 63 which illustrate an alternate seal assembly generally designated by the reference characters 720 having body 722. Body 722, a generally cylindrical member, includes first end 723, second end 724 and outer surface 725. Severed along a plane extending through ends 723 and 724 and angularly disposed to the longitudinal axis, body 722 is sub-divided into first segment 727 and second segment 728. The segments are abutted along the common cutting line 729. In all other aspects not specifically illustrated nor described, seal body 722 is analogous to previously described seal bodies 602 and 662.

First and second encircling grooves 730 and 732 are formed into outer surface 725 at spaced apart locations. Each groove 730 and 732 is skewed to extend about body 722 in a general diagonal relationship to the longitudinal and radial axes. More specifically, groove 730 is defined by a first edge 733 which is closer to the end 723 and a second edge 734 which is closer to the end 724. Similarly, groove 732 is defined by first edge 735 and second edge 737 which reside closer to the ends 723 and 724, respectively. Edge, as defined herein, refers to the apex of the groove with outer surface 727.

Within segment 727, the second edge 734 of groove 730 and the second edge 737 of groove 732 is substantially parallel to the ends 722 and 724 or, alternately, are substantially perpendicularly radial to the longitudinal axis. First edge 733 of groove 730 and first edge 735 of groove 732 are inwardly divergent from the corresponding second edge or, alternately, are diagonal to the longitudinal and to the radial axes of body 722. Within the second segment 728, the respective edges of the grooves 730 and 732 are reversed in direction. That is, the edges 733 and 735 are substantially parallel to the ends 723 and 724 while the edges 724 and 737 are inwardly divergent from the respective first edges.

Figure 64:
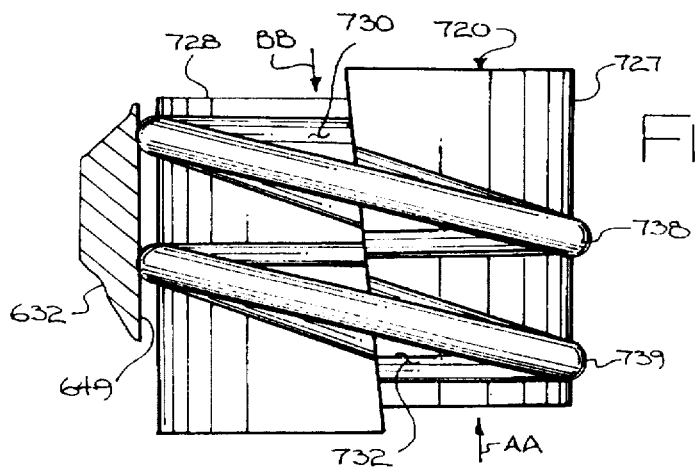
FIG. 64 is a view generally corresponding to the illustration of FIG. 63 and illustrating the seal assembly thereof as it would appear after having compensated for wear of the shaft.

Elastic bands 738 and 739, as particularly seen with reference to FIG. 63, reside within the grooves 730 and 732, respectively. The bands, in the assembled configuration, extend diagonally across body 722. In this configuration, the band 738 lies against first edge 733 of groove 730 within first segment 727 and against second edge 734 within second segment 728. Similarly band 739 within first segment 722 lies against first edge 735 of groove 732 and against second edge 737 within second segment 728. The bands provide biasing means for urging movement of the segments 722 and 728 in mutually convergent radially and axial directions, that is further illustrated in FIG. 64. The bands also provide sealing against the surface 649 of guide body 632. In other aspects not specifically described, reference is made to the description associated with the FIGS. 56 and 57.

Figure 65:
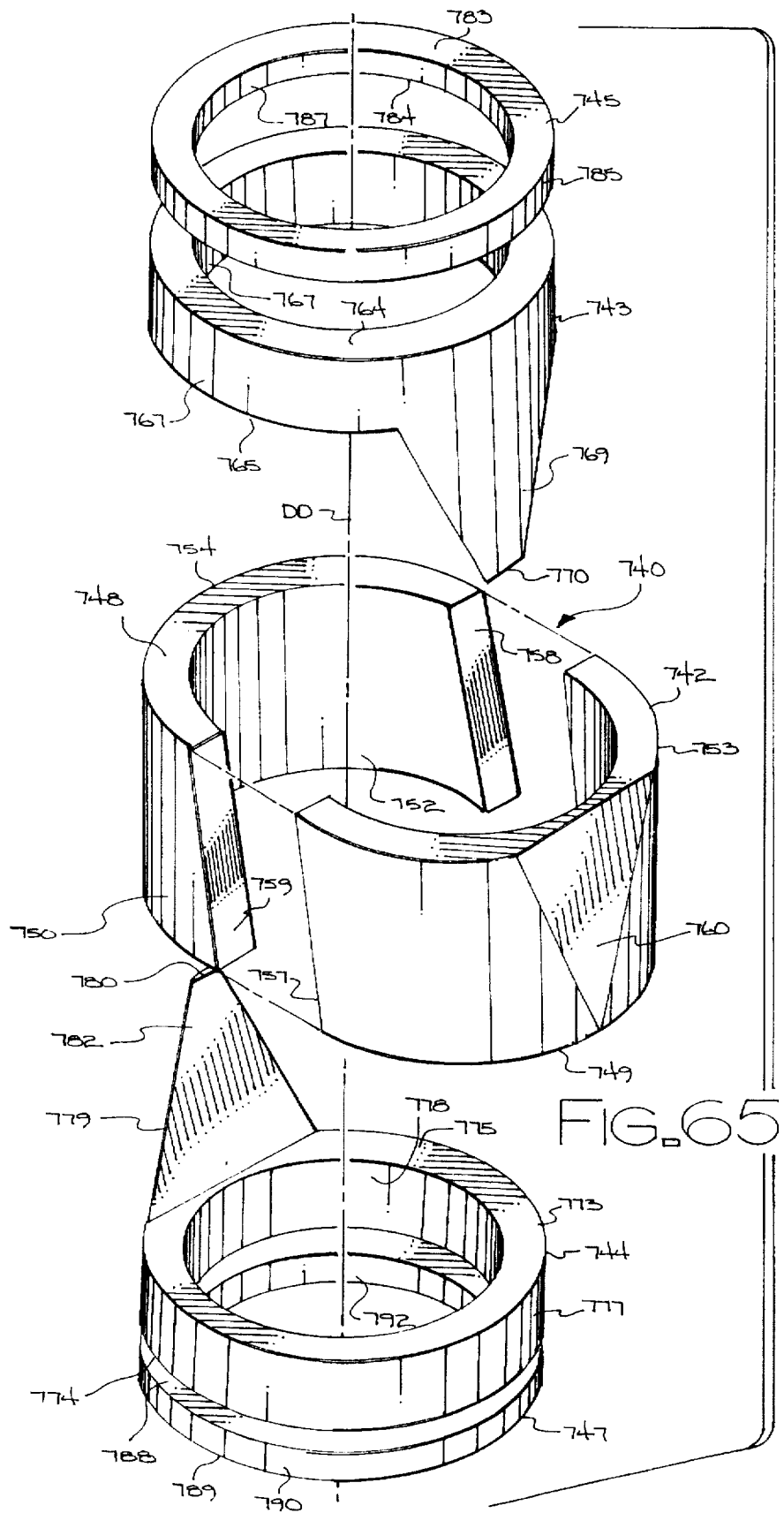
FIG. 65 is an exploded perspective view of still another seal assembly contemplated by the instant invention for purposes of sealing a shaft extending through an opening in a main body.

Reference is now made to FIG. 65 which shows yet another seal assembly, generally designated by the reference character 740, including seal body 742, first and second biasing members 743 and 744, respectively, and first and second biasing means 745 and 747, respectively. Body 742, preferably fabricated of a soft metal such as bronze or a high temperature polymer such as the thermaplastic distributed under the tradename Celazole® and in general similarity to the previously described seal bodies, is a generally cylindrical member having first end 748, second end 749, outer surface 750 and inner surface 752. Inner surface 752 is sized to sealingly engage a shaft 127 of a selected diameter. In further analogy to the previously described seal bodies, body 742 is divided by a cutting plane into first and second segments 753 and 754, respectively. The plane presses through the ends 748 and 749 and is angularly displaced to the longitudinal axis DD. Preferably, the plane intersects axis DD at the mid-point between the ends 748 and 749. Accordingly, the segments 753 and 754 are virtual mirror images. Further, first segment 753 terminates with skewed surfaces 755 and 757 which slidingly abut the skewed surfaces 758 and 759, respectively, of second segment 754.

Figure 66:
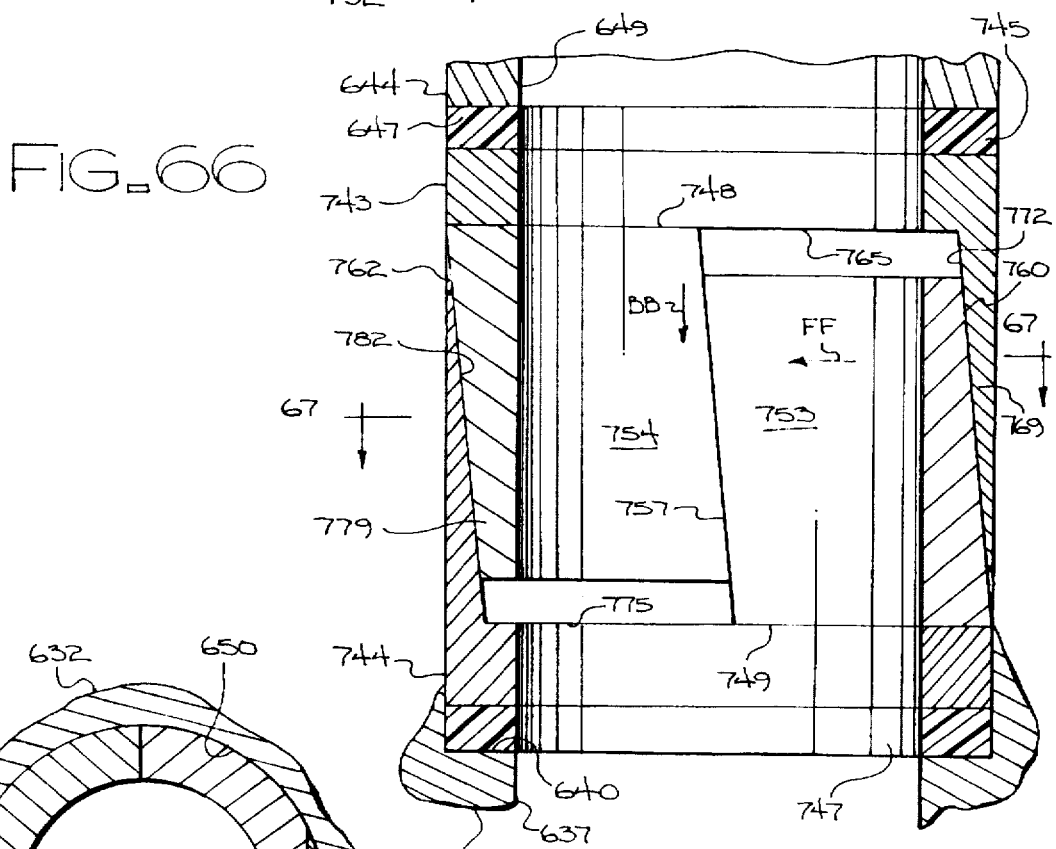
FIG. 66 is a vertical sectional view of the seal assembly of FIG. 65 as it would appear when assembled.

Flats 760 and 762, which function as camming surfaces as will be described presently, are carried by the segments 753 and 754 at diametrically opposed locations. Flat 762 is specifically seen with reference to FIG. 66. The flats are formed on the outer surface 750. Flat 760 extends divergently inward from end 749 toward end 748. In mirror image, flat 762 extends divergently inward from end 748 toward end 749.

First biasing member 743 includes a generally annular base 763 having first end 764, second end 765, outer surface, 767 and inner surface 768. Tang 769, projecting longitudinally from end 765 of annular base 763 shares common outer surface 767 and terminates with free end 770. Inner surface 772 of tang 769 extends divergently outward from base 763 and is generally planar for mating camming engagement with flats 760 carried by first segment 753. Second camming member 744, a mirror image of first camming surface 743 includes annular base 773 having first end 774, second end 775, outer surface 777 and inner surface 778. Tang 779 terminating with free end 780 includes inner planar surface which matingly and cammingly engages flat 762 carried by second segment 754.

First biasing member 745, an annular member fabricated of an elastic material such as Viton™, includes first end 783, second end 784, outer surface 785 and inner surface 787. Similarly second biasing member 747 includes first end 788, second end 789, outer surface 790 and inner surface 792.

Figure 67:
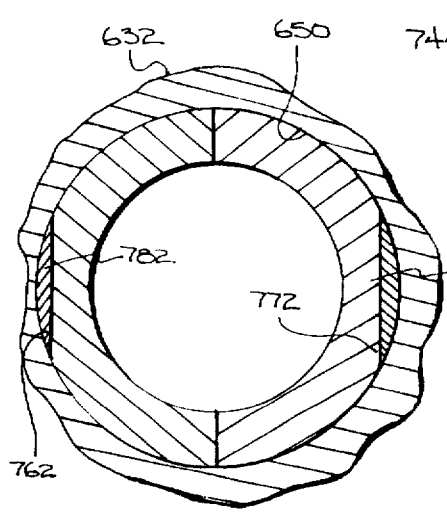
FIG. 67 is a horizontal sectional view taken along the line 67—67 of FIG. 66.

Seal assembly 720, generally in analogy to the previously seal assemblies, is devised to reside within recess 650 of guide assembly 630 or a similar recess formed in the main body through which shaft 127 passes. As seen with particular reference to FIG. 66, the respective skewed surfaces of the body segments 753 and 754 are abutted as is surface 765 of first biasing member 743 against surface 748 of second segment 754. Similarly, surface 775 of second biasing member 744 is abutted against the end of 749 of first segment 753. Correspondingly, as better seen in FIG. 67, camming surface 772 carried by tang 769 is matingly engaged with camming surface 760 carried by first segment 753. Further, camming surface 782 carried by tang 779 is in mating contact with camming surface 762 carried by second segment 754. First biasing means 745 resides in compression between end 647 of tubular member 645 and camming member 743. Similarly, second biasing means 747 resides in compression intermediate shoulder 640 and first camming member 744.

Due to the inherent biasing of the elastic members 745 and 747, base 763 of first biasing member 743 urges second segment 754 of seal body 742 in the direction of the arrowed line EE. In response the same biasing means, tang 769 of first biasing member 743 urges first segment 753 radially inward as indicated by the arrowed line FF. Second biasing member 744 exerts opposing forces upon first segment 753 and second segment 754. Accordingly, the segments 753 and 754 are constantly urged in mutually convergent radial and longitudinal directions to maintain sealing engagement with the shaft 127. Members 745 and 747 further function to seal the assembly within the recess.

Various changes and modifications to the embodiments herein chosen for purposes for illustration will readily occur to those skilled in the art. For purposes of illustration, consistent with the requirements of an internal combustion engine with attenuate heat and loading, it has been suggested that the elements be made of metal, especially cast iron for the first annular member and mild steel for the second annular member. Consistent with the requirements of other apparatus, the seal assembly may be readily fabricated of other metal such as copper or aluminum alloys or synthetics such as plastic or resinous materials. It is also understood that various features specifically described in connection with a given embodiment may be readily incorporated into another embodiment. For example, the node and mating socket shown in FIG. 7, may be readily incorporated into the other embodiments described. To the extent that such modifications and variations do not depart from the spirit of the invention, they are intended to included within the scope thereof which is assessed only by a fair interpretation of the following claims.

Having fully described and disclosed the instant invention in such clear and concise terms as to enable those skilled in the art to understand and practice the same, the claimed invention is set forth below.

We claim:

1. A method for sealing a shaft to a body having a bore in which said shaft is moveably disposed, said method comprising:

providing a seal assembly for sealingly receiving said shaft therethrough, the seal assembly including:

a first annular member having first and second opposed radial surfaces, an outer surface for residing adjacent the body, and a contact surface for engagement with the shaft;

a second annular member having first and second opposed radial surfaces, the first radial surface for residing in juxtaposition with the first annular member, and a contact surface for engagement with the shaft;

a first end gap severing the first annular member along a slanted line which is angularly disposed to intercept a radial line of the first annular member and parallel to a plane defined by the first radial surface of the first annular member, the first end gap separating a first end and a second end of the first annular member which is continuous therebetween; and a second end gap severing the second annular member, the second end gap separating a first end and a second end of the second annular member which is continuous therebetween;

forming a recess into said body in axial alignment with said bore;

placing said seal assembly into said recess; and retaining said seal assembly in said recess.

2. The method of claim 1, wherein the step of retaining includes the substeps of:

providing a retainer;

inserting said retainer into said recess outboard of said seal assembly; and securing said retainer in said recess.

3. The method of claim 2, wherein the step of forming a recess further includes:

shaping a pocket for receiving said seal assembly; and creating a receptacle for receiving said retainer.

4. The method of claim 1, wherein the step of securing includes providing a frictional union between said retainer and said recess.

5. The method of claim 1, further including allowing lateral movement of said seal assembly within said recess.

6. The method of claim 1, further including constricting said seal assembly about said shaft.

* * * * *